(12) United States Patent
Frederick et al.

(10) Patent No.: US 10,561,887 B2
(45) Date of Patent: Feb. 18, 2020

(54) VEHICLE SEAT ASSEMBLY FOR PHYSICAL EXERCISE

(71) Applicant: Toyota Motor Engineering & Manufacturing North America, Inc., Erlanger, KY (US)

(72) Inventors: Scott L. Frederick, Brighton, MI (US); Scott P. Robison, Dexter, MI (US); Adam D. Holmstrom, Pinckney, MI (US); Jaime N. Moore, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 52 days.

(21) Appl. No.: 15/689,534

(22) Filed: Aug. 29, 2017

(65) Prior Publication Data
US 2019/0060699 A1    Feb. 28, 2019

(51) Int. Cl.
A63B 21/16     (2006.01)
A63B 22/06     (2006.01)
(Continued)

(52) U.S. Cl.
CPC ........ *A63B 21/1609* (2015.10); *A63B 21/023* (2013.01); *A63B 21/045* (2013.01);
(Continued)

(58) Field of Classification Search
CPC . A63B 21/023; A63B 21/045; A63B 21/1609; A63B 21/4034; A63B 21/4035; A63B 21/4047; A63B 21/4049; A63B 22/0012; A63B 22/0605; A63B 23/03575; A63B 23/0405; A63B 23/0476; A63B 23/1281; A63B 2022/0652; A63B 2208/0233; A63B 2208/0252;
(Continued)

(56) References Cited

U.S. PATENT DOCUMENTS 4,013,287 A * 3/1977 Dickman ............. A63B 21/023
                                                         482/129
4,265,447 A   5/1981 Shafer
(Continued)

FOREIGN PATENT DOCUMENTS

CN          105143027 A    12/2015

OTHER PUBLICATIONS

Yanko Design, "Charge Up Your Car Inside Your Car", Retrieved from the Internet: <http://www.yankodesign.com/2008/12/14/charge-up-your-car-inside-your-car/>, Retrieved Aug. 25, 2017, 6 pages.

*Primary Examiner* — Megan Anderson
(74) *Attorney, Agent, or Firm* — Christopher G. Darrow; Darrow Mustafa PC

(57) ABSTRACT

A vehicle seat assembly includes a seat base, a seat back rotatably connected to the seat base, a seat bottom mounted on the seat base, and at least one of the following mounted to one of the seat base, seat back, and seat bottom: a resistance mechanism structured to exert a biasing force on at least one exercise arm operatively connected to the resistance mechanism; a bicycle seat receptacle structured for detachably mounting a bicycle seat to the seat base; and a docking mechanism structured for detachably mounting a pedal mechanism to the seat base.

18 Claims, 13 Drawing Sheets

(51) Int. Cl.

| | | |
|---|---|---|
| *A63B 21/00* | (2006.01) | |
| *A63B 21/02* | (2006.01) | |
| *A63B 22/00* | (2006.01) | |
| *A63B 21/045* | (2006.01) | |
| *A63B 23/035* | (2006.01) | |
| *A63B 23/04* | (2006.01) | |
| *A63B 23/12* | (2006.01) | |
| *H02N 11/00* | (2006.01) | |
| *H02J 7/32* | (2006.01) | |
| *B60N 2/90* | (2018.01) | |

(52) U.S. Cl.
CPC ...... *A63B 21/4034* (2015.10); *A63B 21/4035* (2015.10); *A63B 21/4047* (2015.10); *A63B 21/4049* (2015.10); *A63B 22/0012* (2013.01); *A63B 22/0605* (2013.01); *A63B 23/03575* (2013.01); *A63B 23/0405* (2013.01); *A63B 23/0476* (2013.01); *A63B 23/1281* (2013.01); *B60N 2/90* (2018.02); *H02J 7/32* (2013.01); *H02N 11/002* (2013.01); *A63B 2022/0652* (2013.01); *A63B 2208/0233* (2013.01); *A63B 2208/0252* (2013.01); *A63B 2210/02* (2013.01); *A63B 2210/50* (2013.01); *A63B 2225/09* (2013.01)

(58) Field of Classification Search
CPC ............ A63B 2210/02; A63B 2210/50; A63B 2225/09; B60N 2/7005; B60N 2/90; B60N 2002/905; H02J 7/32; H02N 11/002

See application file for complete search history.

(56) References Cited

U.S. PATENT DOCUMENTS

| | | | |
|---|---|---|---|
| 4,639,007 A | | 1/1987 | Lawrence |
| 5,362,296 A | * | 11/1994 | Wang ..................... A63B 21/04 |
| | | | 482/121 |
| 5,568,959 A | | 10/1996 | Weber et al. |
| 5,833,256 A | * | 11/1998 | Gilmore ................ B62K 3/005 |
| | | | 280/224 |
| 6,609,745 B2 | | 8/2003 | Miyahara et al. |
| 7,220,234 B2 | * | 5/2007 | Breneman ............ A61H 1/0266 |
| | | | 482/80 |
| 10,143,885 B2 | * | 12/2018 | DuMee ............... A63B 21/0552 |
| 2009/0212609 A1 | * | 8/2009 | Mattedi .................. A63B 23/12 |
| | | | 297/217.1 |
| 2014/0209399 A1 | * | 7/2014 | Mireshghi ............. B60L 11/007 |
| | | | 180/65.31 |
| 2018/0008855 A1 | * | 1/2018 | Yanev ................ A63B 24/0062 |
| 2019/0053972 A1 | * | 2/2019 | Yamaguchi .............. A61H 7/00 |

\* cited by examiner

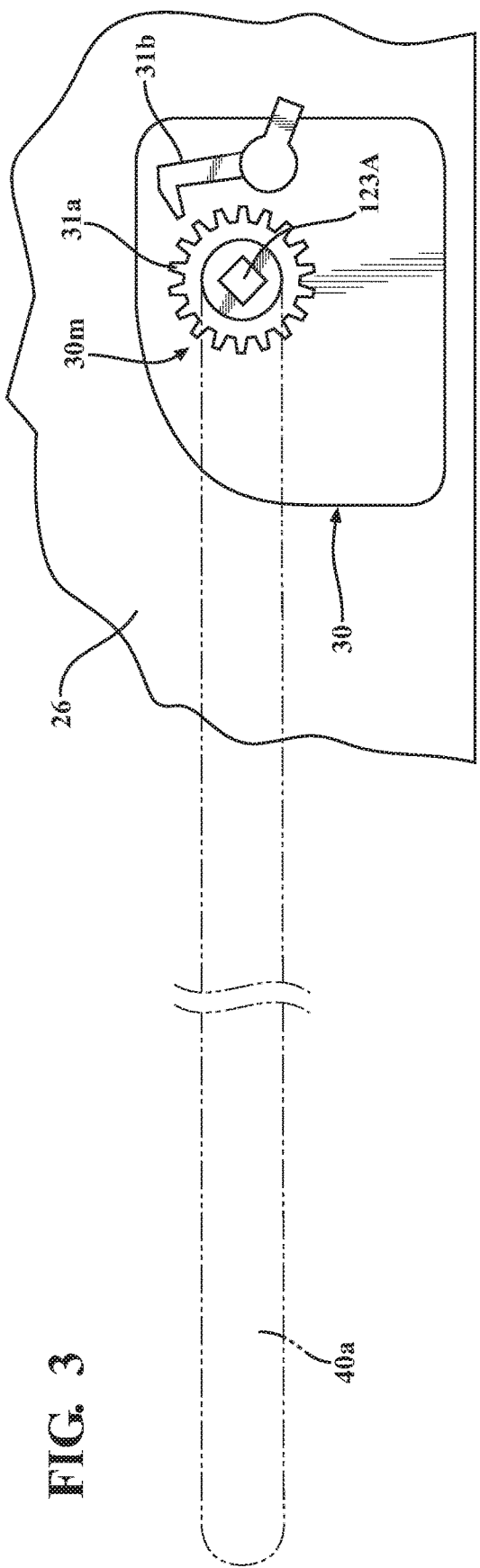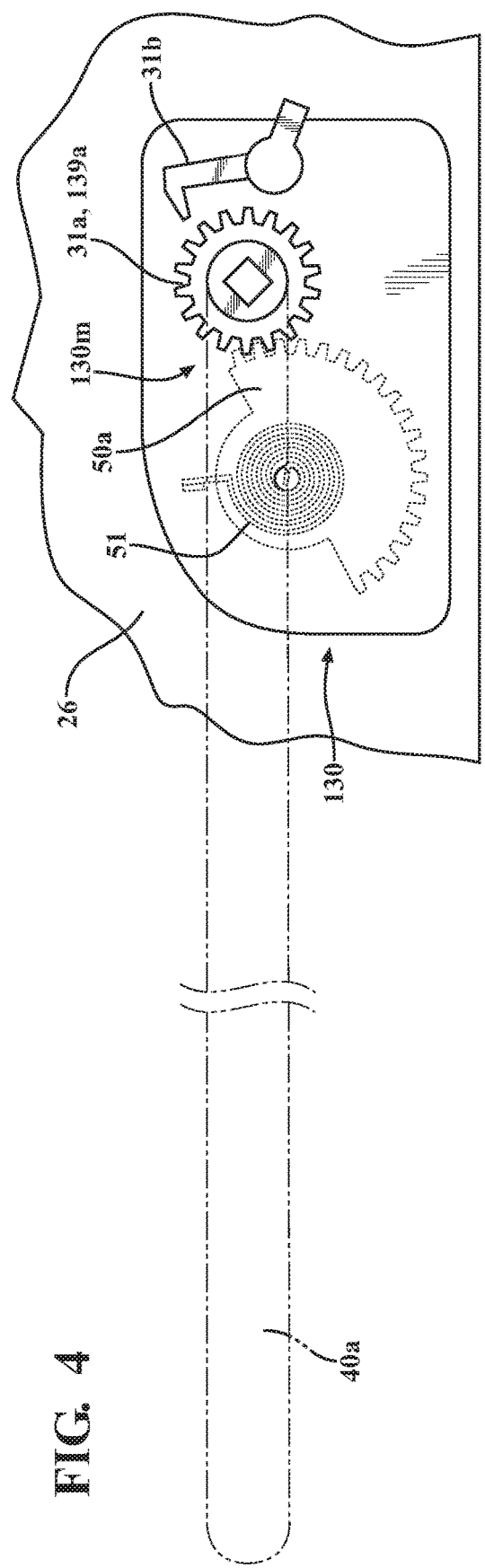

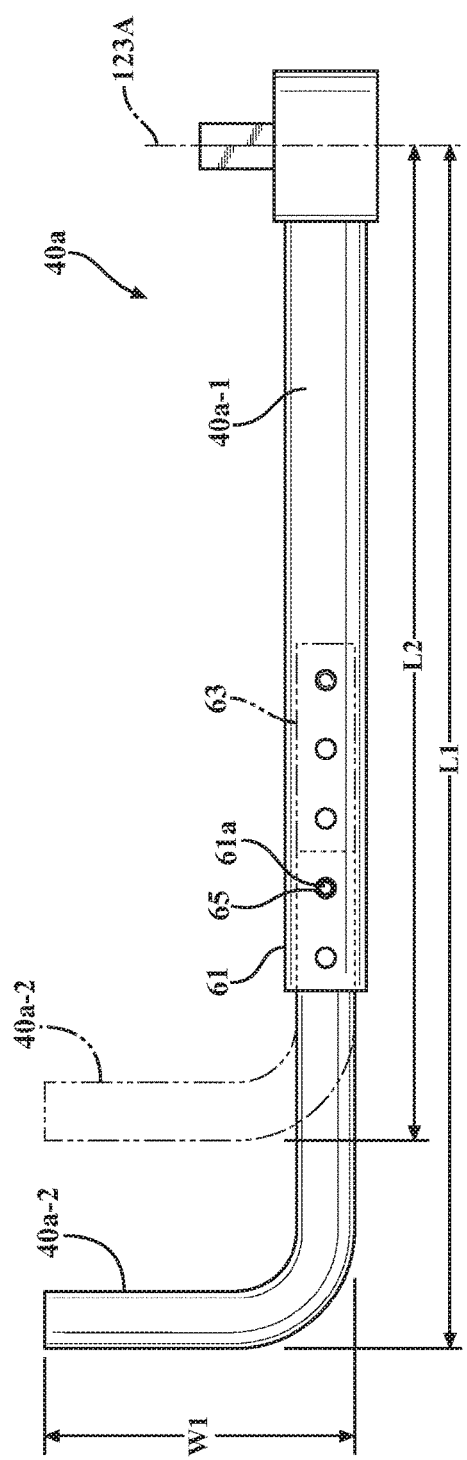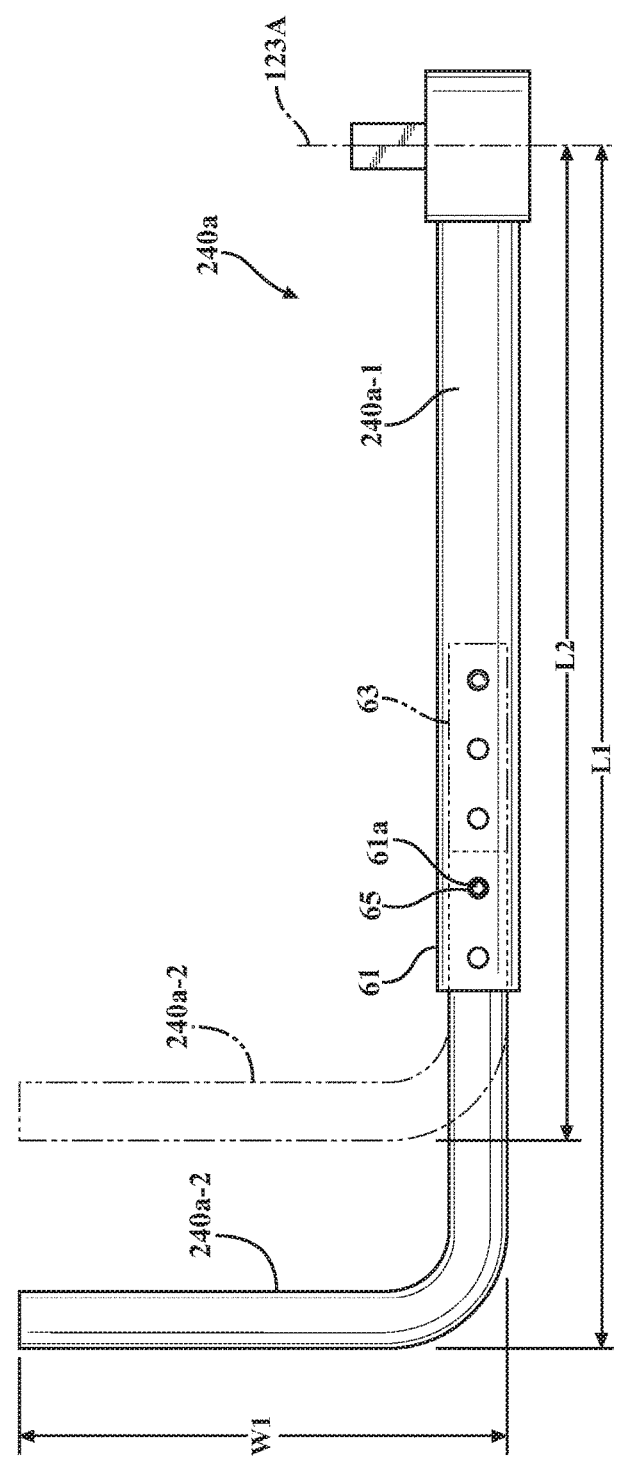

VEHICLE SEAT ASSEMBLY FOR PHYSICAL EXERCISE

TECHNICAL FIELD

The present invention relates to seats for vehicle interiors and, more particularly, to a vehicle seat assembly with features and attachments enabling a vehicle occupant to engage in various physical exercises while the vehicle is in operation.

BACKGROUND

Occupants of conventional and autonomous vehicles may be seated for long periods before reaching their travel destinations. During this time, it may be difficult or impossible for the occupants to exercise or engage in any physically beneficial activity. If the occupants spend a relatively large percentage of their time traveling in their vehicles and also have other demands on their time when they are not traveling, the inability to exercise may have long-term detrimental effects on their health.

SUMMARY

In one aspect of the embodiments described herein, a vehicle seat assembly is provided. The vehicle seat assembly includes a seat base, a seat back rotatably connected to the seat base, a seat bottom mounted on the seat base, and at least one of the following mounted to one of the seat base, seat back, and seat bottom: a resistance mechanism structured to exert a biasing force on at least one exercise arm operatively connected to the resistance mechanism; a bicycle seat receptacle structured for detachably mounting a bicycle seat to the seat base; and a docking mechanism structured for detachably mounting a pedal mechanism to the seat base.

In another aspect of the embodiments described herein, a vehicle seat assembly is provided. The vehicle seat assembly includes a seat and at least one of a pedal mechanism connected to the seat so as to be operable by an occupant of the seat, and at least one exercise arm rotatably connected to the seat so as to be operable by an occupant of the seat.

BRIEF DESCRIPTION OF THE DRAWINGS

FIG. 3 is a schematic side view of a portion of the vehicle seat assembly of FIGS. 1 and 2 showing a resistance mechanism in accordance with an embodiment described herein, for rotatably mounting one or more exercise arms to the seat base.

FIG. 4 is a schematic side view of a portion of a vehicle seat assembly incorporating a resistance mechanism in accordance with another embodiment described herein, for rotatably mounting one or more exercise arms to the seat base.

FIG. 7 is a schematic plan view of an adjustable exercise arm in accordance with one embodiment described herein.

FIG. 8 is a schematic plan view of an adjustable exercise arm in accordance with another embodiment described herein.

DETAILED DESCRIPTION

Figure 1:
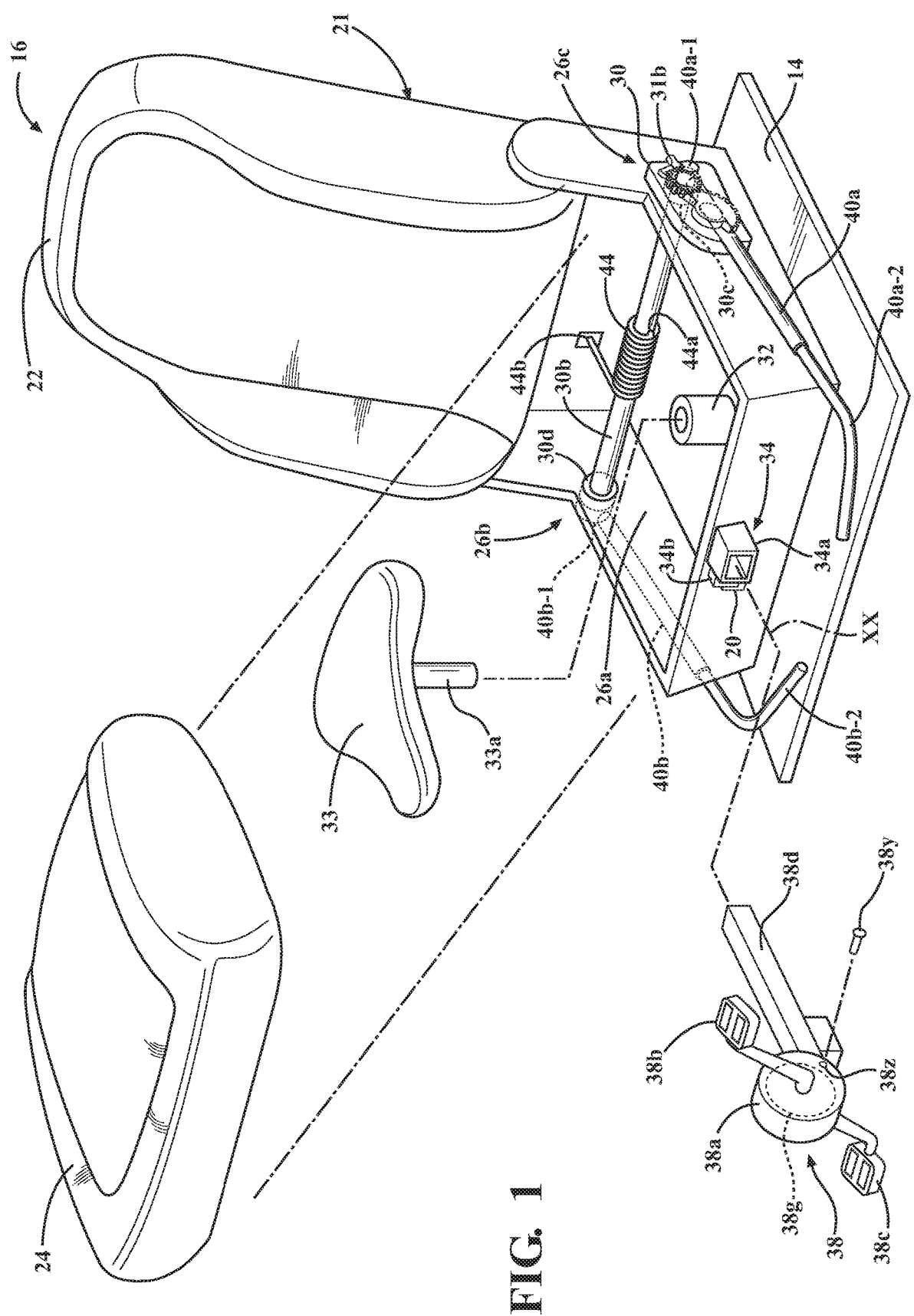
FIG. 1 is an exploded schematic perspective view of a vehicle seat assembly in accordance with an embodiment described herein, including a seat base incorporating a resistance mechanism for rotatably mounting one or more exercise arms to the seat base, and a pedal mechanism.

Embodiments described herein relate to a vehicle seat assembly structured to function as a conventional vehicle seat in one operational mode, and as an exercise seat in another operational mode. The vehicle seat assembly includes several features enabling various exercise accessories to be connected to portions of the seat to permit a seat occupant to perform various associated physical exercises while residing within the vehicle. The vehicle seat assembly is structured to be easily installed in a vehicle and removed from the vehicle. Embodiments of the vehicle seat assembly may also include the various accessories when attached to the seat.

As described herein, components "connected" to each other may be directly connected (by physical contact) or indirectly connected (i.e., through an intermediate part, for example a shaft indirectly connected to a housing by attaching the shaft to a bearing rotatably mounted to the housing). Also, a component "rotatably connected" to another component is rotatable with respect to the other component. For example, shaft 30b shown in FIG. 1 herein may be "rotatably connected " to seat base 26 by mounting the shaft 30b on bearings 30c, 30d positioned near opposite ends of the shaft 30b and mounted along opposite sides of the seat base 26.

Elements are "operatively connected " to or with each other when they are connected so as to operate or be operable with respect to each other in a manner described in the specification. Embodiments of a pedal assembly and/or an exercise arm described as being connected to a vehicle seat are understood to be connected to the seat so as to enable performance of various associated exercises by an occupant of the seat, as described herein. Also, elements which are described herein as being electrically connected to or with each other are connected in a manner allowing an electric current to pass between the elements.

Embodiments of the vehicle seat assembly described herein may be structured to function as a conventional vehicle seat when no exercise accessories are attached to the seat. In addition, the embodiments of the vehicle seat assembly described herein may be structured to be easily mounted on a mounting structure in side the passenger compartment used by a conventional vehicle seat. The vehicle seat embodiments described herein may be easily installed and removable from the vehicle. Also the vehicle seat assembly embodiments described herein may be structured to occupy as small a volume or space envelope within the vehicle interior as possible, both prior to and during operation of the vehicle seat assembly in an exercise mode, and consistent with the particular exercise function being performed.

As used herein, the term "occupant" or "seat occupant" refers to a person sitting in the seat of the vehicle seat assembly. The term "user" may also refer to a person sitting in the seat of the vehicle seat assembly, or to a person not sitting in the seat (for example, a person making adjustments to the vehicle seat assembly or exercise attachments from outside the seat). Also, in the embodiments described herein, the terms "forward", "forwardly" and "forward-most" are understood to signify a direction toward a front of the vehicle or from the seat back toward a front-edge of the seat bottom. Similarly, the terms "rearward", "rearwardly" and "rear-most" are understood to signify a direction toward a rear of the vehicle or from the front-edge of the seat bottom toward the seat back.

Figure 2:
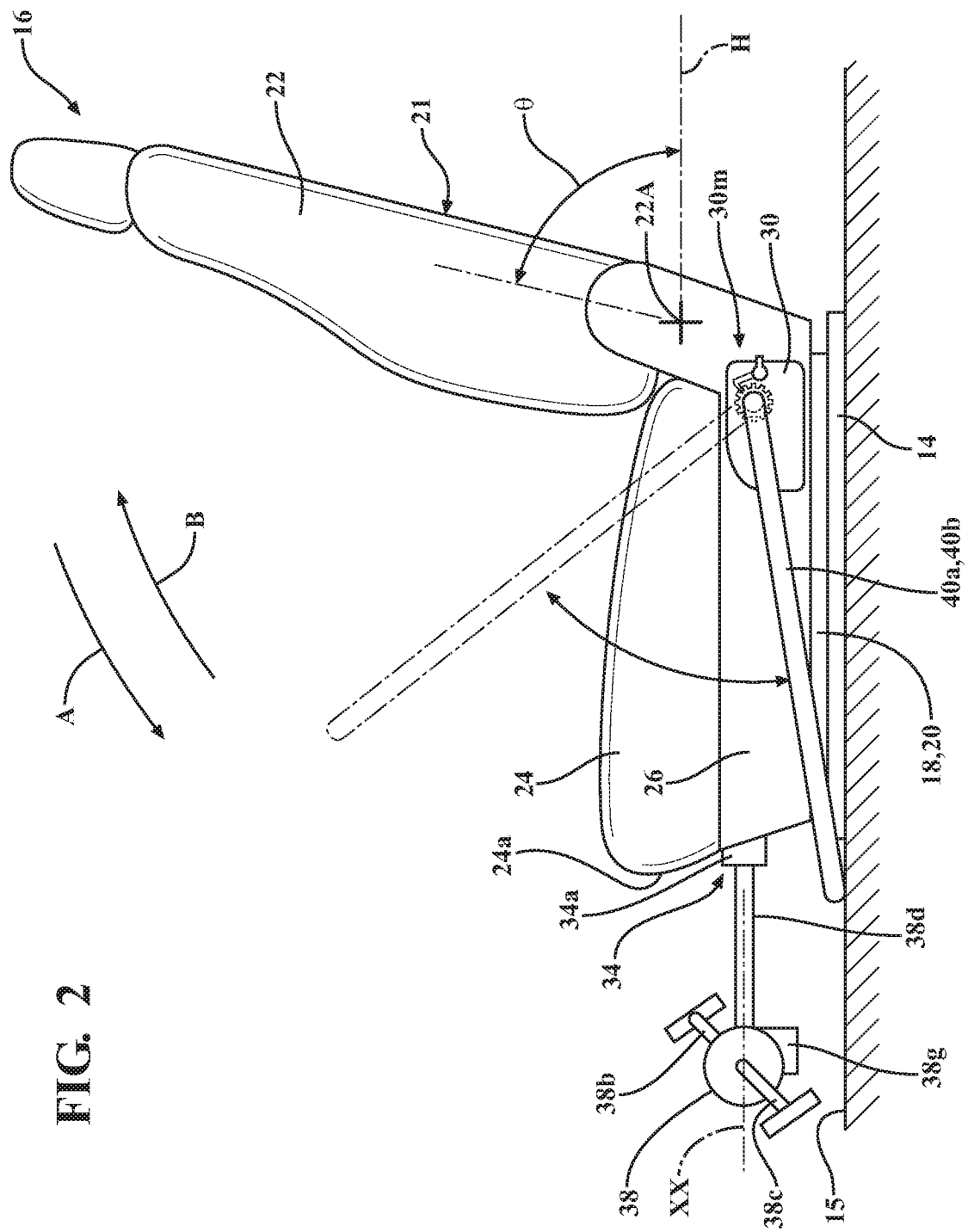
FIG. 2 is a schematic side view of the vehicle seat assembly of FIG. 1

FIGS. 1-3 show views of a vehicle seat assembly 16 for use in a vehicle (not shown) in accordance with an embodiment of the present disclosure. The vehicle seat assembly embodiment shown may be mounted in any location in the vehicle where a vehicle seat may be positioned and where available space allows. For example, the vehicle seat assembly 16 may be positioned in any of a front, middle or back row of the vehicle.

In one or more arrangements, vehicle seat assembly 16 may include a seat 21 formed by a seat base 26, a seat back 22 rotatably connected to the seat base 26, a seat cushion or bottom 24 mounted on the seat base 26, and at least one of a resistance mechanism (generally designated 30), a bicycle seat receptacle 32, and a docking mechanism (generally designated 34) mounted to one of the seat base 26, seat back 22, and seat bottom 24. Each of the resistance mechanism 30, bicycle seat receptacle 32, and docking mechanism 34 may enable attachment of an associated exercise accessory to a portion of the vehicle seat 21, thereby incorporating the associated exercise accessory into the vehicle seat assembly 16. Exercise accessories may include a conventional bicycle seat 33, a pedal mechanism 38, and/or one or more exercise arms (for example, exercise arms 40a and 40b as shown in FIGS. 1-3). Other accessories may also be included in additional embodiments of the vehicle seat assembly.

The resistance mechanism (generally designated 30) may be structured as described herein to exert a biasing force on at least one exercise arm (such as exercise arm 40a, described in greater detail below) operatively connected to the resistance mechanism. The bicycle seat receptacle 32 may be structured as described herein for detachably mounting a conventional bicycle saddle seat 33 to the seat base 26. The docking mechanism 34 may be connected to the seat base 26 and may be structured for detachably mounting a pedal mechanism (such as pedal mechanism 38, described below) to the seat base 26 as described herein.

Referring to FIGS. 1 and 2, a foundation frame 14 may be mounted to a floor 15 of the vehicle, and the vehicle seat assembly 16 may be mounted on the foundation frame 14. Foundation frame 14 may have a first rail 18 and a second rail 20 mounted thereon. Each of rails 18, 20 may be connected to one or more complementary features provided on seat base 26, and may be structured to support vehicle seat assembly 16 for movement therealong in a manner known in the art. Foundation frame 14 is structured to support vehicle seat assembly 16 above vehicle floor 15. Vehicle seat assembly 16 may be mounted on the foundation frame 14 in a known manner (for example, on rails 18 and 20) so as to be movable relative to foundation frame 14. For example, seat base 26 may be operatively connected to rails 18 and 20 of foundation frame 14 for forward and rearward movement along foundation frame 14. In the embodiment shown, the seat base 26 is connected to the rails for sliding movement along the foundation frame, in a manner known in the art.

Figure 5:
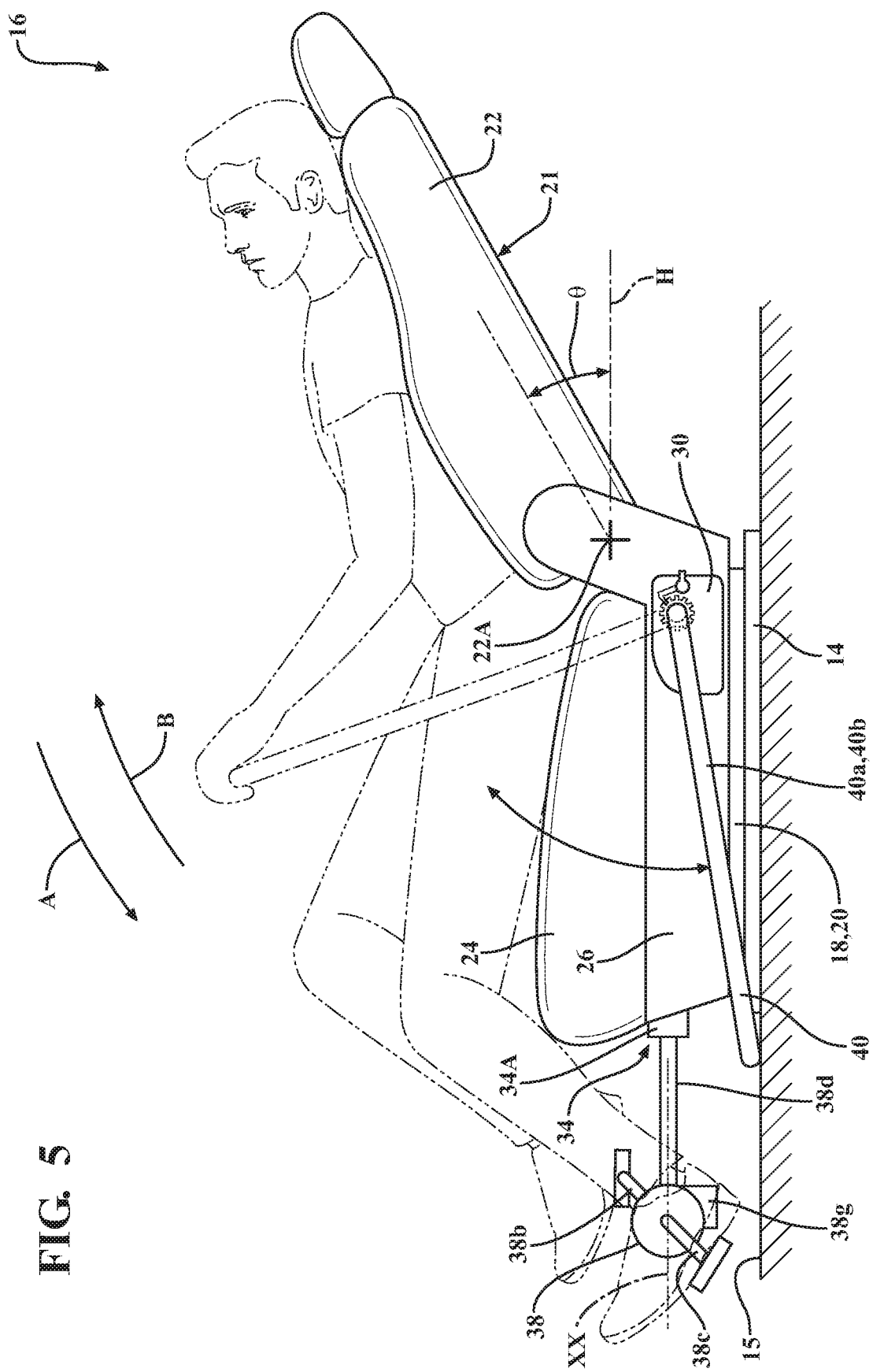
FIG. 5 is a schematic side view of the vehicle seat assembly in FIGS. 1-3, showing a seat occupant performing a rowing exercise.

In addition, seat back 22 may be rotatably connected to seat base 26 so as to facilitate rotation of the seat back 22 in a conventional manner about a seat-back pivot axis 22A, between a fully reclined configuration as shown in FIG. 5 and a folded-down configuration (not shown). In the fully reclined configuration of seat back 22, an angle θ formed between a rear face of the seat back 22 and a horizontal plane H extending from the seat back pivot axis 22A toward a rear of the vehicle is minimized.

A conventional, known seat back recline mechanism (not shown) may rotatably connect the seat back 22 to the seat base 26. In a manner known in the art, in a normal operational mode, the recline mechanism may be operated by an actuation lever (not shown) to permit rotational adjustment of the seat back 22 to any one of a number of discrete, predetermined orientations, up to and including a fully reclined or back-leaning orientation after rotation of the seat back 22 in direction "B". The recline mechanism is also actuatable to lock the seat back in a desired orientation during normal vehicle operation, or otherwise to prevent rotation of the seat back about axis 22A. As known in the art, the seat back 22 may be locked in the desired orientation by releasing the actuation lever when the seat back has been oriented at the desired angle. Referring to FIG. 2, in a manner known in the art, seat back 22 may also be spring-loaded so as to bias rotation of the seat back 22 in the direction indicated by arrow "A" when the actuation lever is operated to release the seat back from a locked condition. Thus, the actuation lever operates the recline mechanism to permit seat back rotation in a conventional usage mode.

In one operational mode, vehicle seat assembly 16 may be used in a conventional manner as a vehicle seat. In additional (or alternative) operational modes, vehicle seat assembly 16 may be used as an exercise seat in which a seat occupant may perform any of a variety of exercises when the vehicle is stationary or in motion. In one or more arrangements, for example, an embodiment of vehicle seat assembly 16 may be incorporated into an autonomous vehicle to permit a vehicle occupant seated in the driver's position to exercise while the vehicle is operating in an autonomous mode. In one or more arrangements, an embodiment of vehicle seat assembly 16 may also be positioned in a middle seat row or rear seat row of the vehicle, to enable a passenger in an autonomous or manually-operated vehicle to exercise while riding in the vehicle.

Referring to FIG. 1, in one or more arrangements, the seat bottom 24 may be removably secured to the seat base 26 using a manually actuatable latching mechanism (not shown), for example. The seat bottom 24 may then be removed by a user to access the bicycle seat receptacle 32 to install a bicycle seat therein. The bicycle seat 33 may be a conventional bicycle saddle seat including a tubular mounting bar 33a adapted to be received in a conventional bicycle frame in a known manner. In one or more arrangements, the receptacle 32 is also structured for positioning and/or detachably mounting the seat bottom 24 to the receptacle to detachably secure the seat bottom to the seat base 26. The seat base 26 may also define a cavity 26a structured to enable stowing of the bicycle seat 33 therein when the bicycle seat is not mounted to the seat base 26.

Referring to FIGS. 1 and 2, as stated previously, the docking mechanism 34 may be connected to the seat base 26 and may be structured for detachably mounting a pedal mechanism 38 to the seat base. In one or more arrangements, the docking mechanism 34 includes a docking receptacle 34a and a charging interface 34b. In one or more arrangements, the docking receptacle 34a is in the form of a sleeve or bracket structured to enable a mounting projection 38d of pedal mechanism 38 to be slidingly inserted into the docking receptacle 34a and supported in the receptacle.

The charging interface 34b may include circuitry and other hardware (for example, wiring, a transformer, etc.) needed for converting electric current generated by pedal mechanism 38 into a form suitable for charging a vehicle battery and/or charging an electronic device (for example, a cellular phone or other battery-powered device). The charging interface 34b may also include an A/C power outlet which may be electrically connected to a battery of a vehicle in which the vehicle seat assembly resides, for powering an A/C device such as a laptop computer, for example. In one or more arrangements, the charging interface 34b may have an A/C power outlet and one or more USB ports, for example.

The charging interface 34b may incorporate power distribution logic configured to determine what electrical loads are electrically connected to the charging interface, and configured to allocate power generated by the pedal mechanism 38 in accordance with predetermined priorities. For example, if the power distribution logic determines that one or more electronic devices are plugged into the charging interface 34b, the logic may allocate generated power to the electronic devices until the devices are fully charged. After the electronic devices are fully charged, any additional generated power may then be directed to the vehicle battery. Other charging priority schemes are also possible.

The charging interface 34b may also incorporate a power connection interface (not shown) adapted to electrically connect or mate to a complementary power connection interface incorporated into (or electrically connected to) a generator 38g of the pedal mechanism 38. The pedal mechanism and charging interface power connection interfaces may be in the form of known mateable electrical connectors, for example. Mating of the pedal mechanism and charging interface power connection interfaces enables an electric current generated by operation of the pedal mechanism 38 to be transmitted to the charging interface 34b. This enables power from the pedal mechanism 38 to charge the vehicle battery or operate an electronic device. The connectors may be mated by the user after the pedal mechanism 38 has been positioned as desired, or the connectors may be mounted to the pedal mechanism 38 and the seat base 26 so that they will mate automatically when the pedal mechanism 28 is connected to the seat base 26.

Referring to FIGS. 1 and 2, pedal mechanism 38 may be provided for docking with the docking receptacle 34a. Pedal mechanism 38 may include a base portion 38a to which a pair of conventional foot pedals 38b, 38c may be rotatably mounted. Each pedal may have an adjustable toe strap (not shown) attached thereto to for securing the foot of a user to the pedal in a known manner. The base portion 38a may be mounted to a mounting projection 38d which enables the pedal mechanism 38 to be mounted to the docking receptacle 34a. Base portion 38a may house any mechanism needed to rotationally connect the foot pedals 38b, 38c to the base portion, as well as components of the pedal mechanism generator 38g. Generator 38g may be mounted inside base portion 38a. The generator may be operatively connected to the rotatable pedals using a suitable mechanism (not shown) so that rotation of the foot pedals 38b, 38c operates the generator 38g in a known manner to generate an electric current.

In particular embodiment, the pedal mechanism 38 may include a pedal locking mechanism structured to be actuatable to prevent rotation of the pedals by a seat occupant, and also to release the pedals 38b, 38c for further rotation and operation by the seat occupant. This enables the pedals 38b, 38c to be locked and maintained in desired positions by a seat occupant, so that the pedals may be used as bracing or stabilizing surfaces by an occupant during performance of one or more exercises, such as a rowing exercise or arm curling exercise as described herein. The locking mechanism may have any structure suitable for the purposes described herein. In the embodiment shown in FIG. 1, for example, a notch or hole 38z may be formed in the base portion 38a which enables a locking pin 38y or other insert to be inserted into the base portion 38a to prevent rotation of the foot pedals 38b, 38c with respect to the mounting projection 38d. Alternatively, any of a variety of other locking mechanism structures may be used.

The mounting projection 38d may be slidingly positionable in the docking receptacle 34a and securable along an axis of insertion XX at a desired location with respect to the seat base 26. This enables the user to position and lock the pedal rotation axis of the pedal mechanism in a desired location, for the comfort of the seat occupant. The mounting projection 38d may be secured in the docking receptacle 34a using any of a variety of methods, for example, a spring pin, a conventional locking pin, etc.

Any suitable method may be provided for enabling a user to vary the resistance to rotation of the foot pedals 38b, 38c. For example, a known mechanism (such as a knob turnable to adjust the pressure applied by a friction wheel to the pedal mechanism during rotation of the pedals) may be operatively connected to the base portion to enable a user to vary the resistance to pedal rotation, in a known manner. In another example, an electromagnet may be incorporated into the base portion to enable the variation in viscosity of an MR (magnetorheological) fluid during magnetization to be used to vary the pedaling resistance.

Figure 12A:
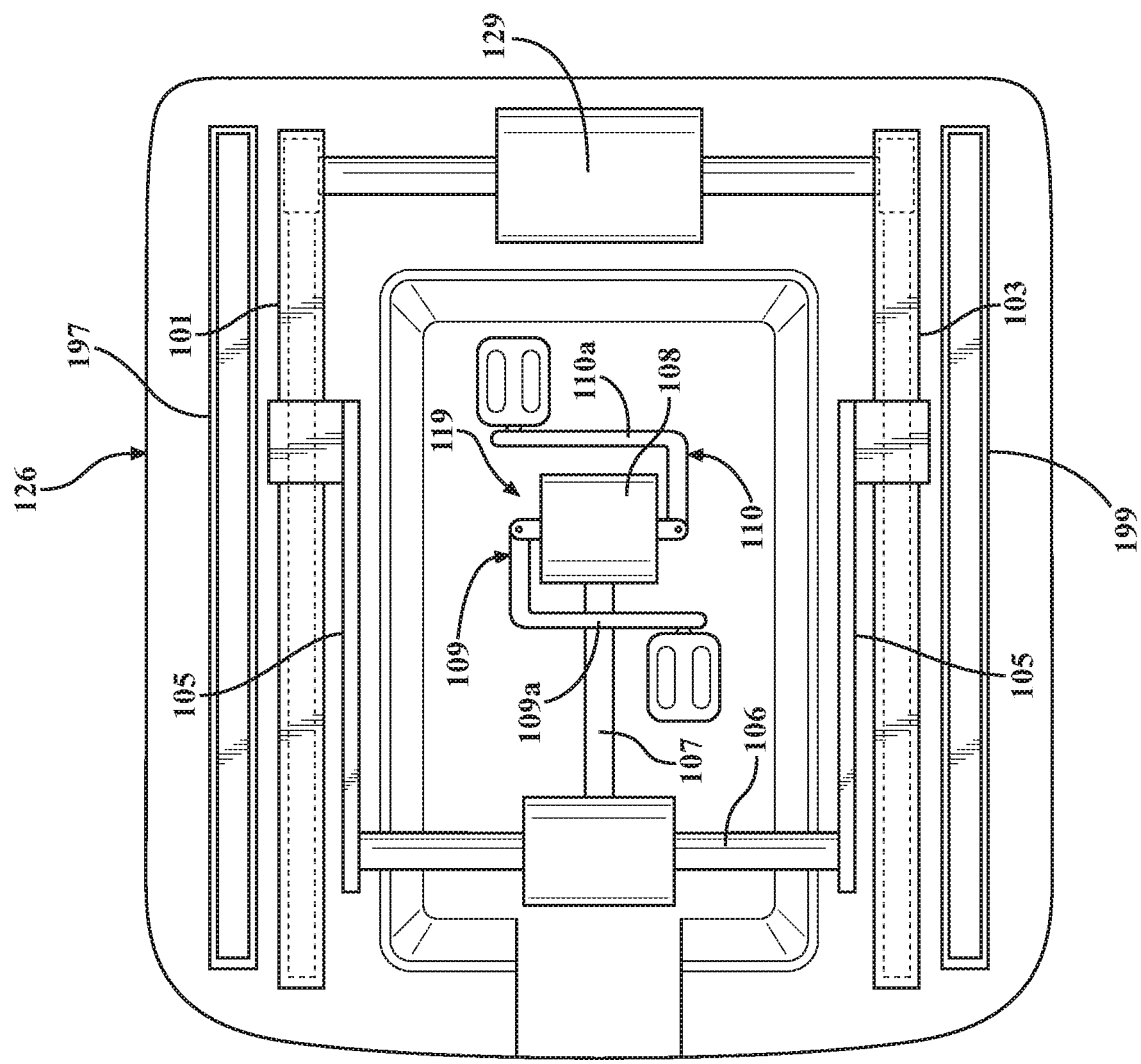
FIG. 12A is a schematic view of an underside of a seat base structured to enable retraction and stowage of a pedal mechanism thereunder, in accordance with an embodiment described herein.
Figure 12B:
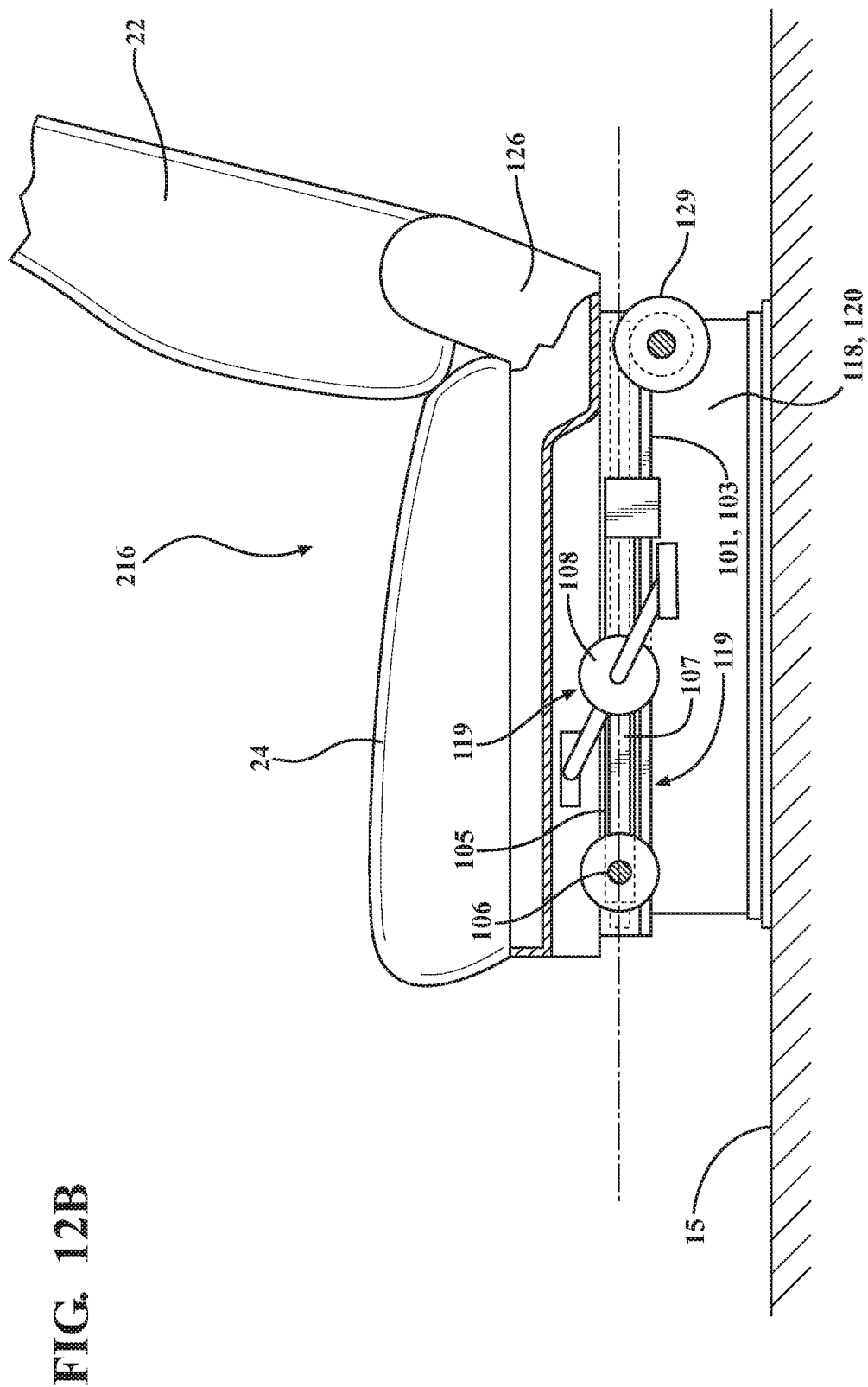
FIG. 12B is a schematic partial cross-sectional side view of the seat base and pedal mechanism shown in FIG. 12A.
Figure 13A:
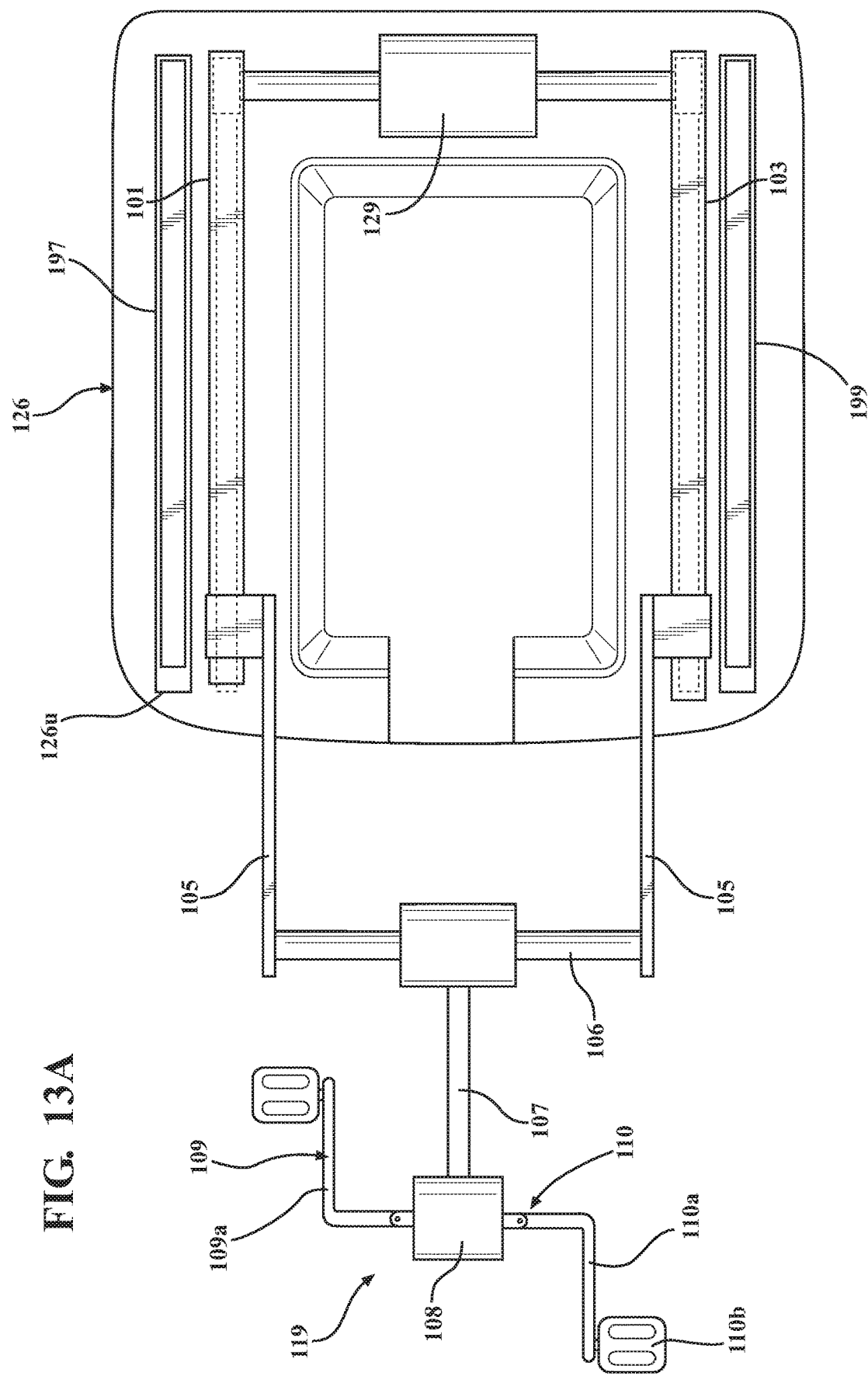
FIG. 13A is the schematic view of FIG. 12A showing the pedal mechanism in an end-use or deployed configuration.
Figure 13B:
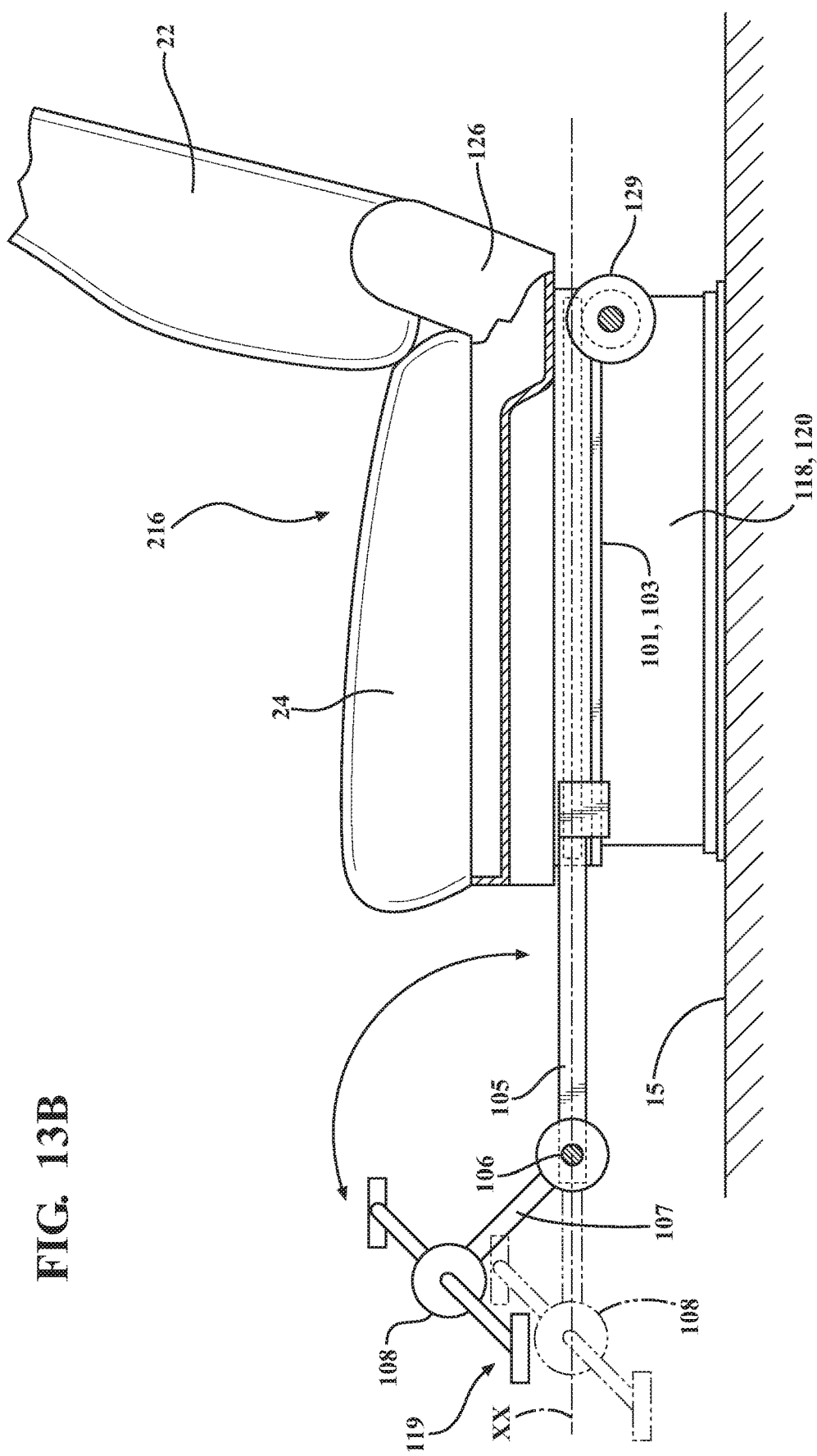
FIG. 13B a schematic partial cross-sectional side view of the seat base and pedal mechanism shown in FIG. 13A, showing operation of the pedal mechanism to deploy the mechanism from the stowed configuration.

FIGS. 12A-13B show another method of coupling an embodiment 119 of a pedal mechanism to a seat base 126 which may be incorporated into another embodiment 216 of the vehicle seat assembly. The pedal mechanism 119 may include all of the power generation features of the pedal mechanism 38 previously described, In addition, pedal mechanism 119 may be permanently or removably securable to an underside of the seat base 126 to enable stowing of the pedal mechanism under the seat base 126 when not being used. FIG. 12A is a schematic view of an underside of a seat base 126 structured to enable retraction and stowage of a pedal mechanism 119 thereunder, in accordance with an embodiment described herein. FIG. 12A shows the pedal mechanism 119 in a stowed or retracted configuration. FIG. 12B is a schematic partial cross-sectional side view of the seat base and pedal mechanism 119 as shown in FIG. 12A. FIG. 13A is the schematic view of FIG. 12A showing the pedal mechanism 119 in an end-use or deployed configuration. FIG. 13B a schematic partial cross-sectional side view of the seat base and pedal mechanism shown in FIG. 13A, showing operation of the pedal mechanism 119 to deploy the mechanism from the stowed configuration.

In the embodiment shown in FIGS. 12A-13B, a pair of channels or brackets 197, 199 may be provided extending along an underside 126u of the seat base 126 to enable mounting of the seat base 126 to the vehicle floor in a conventional manner using rails 118, 120. In this embodiment, rails 118, 120 may be structured to provide an appropriate amount of spacing of seat base 126 from the floor 15 as needed for deployment of the pedal mechanism 119 as described herein. A pedal support member 105 may be mounted to each of tracks 101, 103 and may be structured to be movable along the track. The pedal support members 105 may be mounted to the tracks 101, 103 using any suitable method (roller bearings for example). Alternatively, the pedal support members 105 may be slidably mounted to the tracks 101, 103. A cross member 106 may be rotatably coupled to pedal support members 105 proximate associated opposite ends of the cross member.

A cross member locking mechanism (not shown) may be provided to prevent rotation of the cross member 106 with respect to the pedal support members 105 when the cross member 106 is in a desired rotational position (for example, one of the stowed configuration shown in FIGS. 12A, 12B and the deployed configuration shown in FIGS. 13A, 13B). A pedal extension arm 107 may be fixedly connected to the cross member 106. A pedal mechanism base portion 108 may be attached to an end of the pedal extension arm 107. A pair of pedal assemblies 109, 110 may be coupled to base portion 108. Each of pedal assemblies 109, 110 may include an associated pedal stem (stem 109a in pedal assembly 109, stem 110a in pedal assembly 110) and a foot pedal (foot pedal 109b in pedal assembly 109, foot pedal 110b in pedal assembly 110). Each of pedal stems 109a, 110a may also be rotatable with respect to the base portion 108 between the stowed configuration (shown in FIGS. 12A, 12B) and the end-use or deployed configuration (shown in FIGS. 13A, 13B) using, for example, a hinge. Each of pedal stems 109a, 110a may also be lockable in either of the configurations shown in FIGS. 12A-13B. The cross member 106 may be rotated as shown in FIG. 12B to being the foot pedals 109b and 110b to a position forward of the cross member 106.

The pedal assemblies 109, 110 may be rotatably coupled to the base portion 108 such that, when the pedal stems 109a, 110a are locked in their use configurations, the pedal assemblies 109, 110 may be rotated in a conventional manner with respect to the base portion 108 by a seated occupant operating the associated foot pedals 109b, 110b. In this mode of operation, the pedal assemblies 109, 110 are rotated by the seated occupant in a manner similar to that of a user pedaling a conventional bicycle. The pedal assemblies 109, 110 may be locked in their stowed configurations for rotation of the cross member 106 with respect to the pedal support members 105 and stowing of the pedal mechanism under the seat base 126 as shown in FIG. 12A-12B.

Movement of the pedal support members 105 along tracks 101, 103 may control the spacing between the base portion 108 and the seat base 126, so that a seated occupant may adjust the spacing between the seat base 126 and the foot pedals 109b, 110b to his or her particular needs. Pedal support members 105 may be movable along tracks 101, 103 either manually or by a motor 129 operatively coupled to the pedal support members 105 and controllable by a user. Pedal support members 105 may be operatively coupled to an output shaft (not shown) of the motor 129 by any suitable mechanism (for example, a rack and pinion gear system or a chain). The motor control (not shown) may be accessible in a conventional manner from along a side of the vehicle seat assembly. The motor 129 may also be configured in a known manner to move the seat base 126 in forward and rearward directions within the vehicle, for example, along rails 18, 20. In embodiments where the pedal support members 105 are manually moved along the tracks 101, 103, a locking mechanism (not shown) may be provided to lock the pedal support members 105 in desired positions along the tracks.

To deploy the pedal mechanism 119, pedal support members 105 may be moved forwardly along tracks 101, 103, either manually or using motor 129. Base portion 108 and pedal extension arm 107 may then be rotated forwardly and above cross member 106, to a deployed position in front the cross member 106 as shown in FIGS. 13A and 13B, fro example. The base portion 108 and pedal extension arm 107 may then be locked in the forward position for use by a seat occupant. Distance between the seat bottom 24 and pedals may be fine tuned by further movement of the pedal support members 105 along tracks 101, 103.

Referring again to FIGS. 1-3, as stated previously, the vehicle seat assembly 16 may include a resistance mechanism 30 structured to exert a biasing force on at least one exercise arm 40 operatively connected to the resistance mechanism. The embodiment shown in FIGS. 1-3 includes a pair of exercise arms 40a and 40b operatively connected to the resistance mechanism, with one exercise arm 40a on the left side of the vehicle seat assembly 16 (from a seat occupant's perspective) and another exercise arm 40b on the right side of the vehicle seat assembly 16. In other embodiments, a single exercise arm may be operatively connected to the resistance mechanism along one of the left and right side of the vehicle seat assembly 16. Although the description below will focus on the operation of a single exercise arm 40a connected to the resistance mechanism, the description may be applicable to operation of both exercise arms 40a and 40b simultaneously, or to any single exercise arm mounted to the resistance mechanism.

In one or more arrangements, an exercise arm may include an attachment portion structured to be operatively connected to the resistance mechanism 30, and an occupant manipulation portion connected to the attachment portion and structured to be grasped by a user during performance of an exercise. For example, in the embodiment shown in FIGS. 1-3 and 11, exercise arm 40a includes an attachment portion 40a-1 structured to be operatively connected to the resistance mechanism 30, and an occupant manipulation portion 40a-2 connected to the attachment portion 40a-1 and structured to be grasped by a user during performance of an exercise. Similarly, exercise arm 40b includes an attachment portion 40b-1 structured to be operatively connected to the resistance mechanism 30, and an occupant manipulation portion 40b-2 connected to the attachment portion 40b-1 and structured to be grasped by a user during performance of an exercise.

The resistance mechanism 30 may be structured to exert a biasing force acting on the exercise arm 40a which urges rotation of the exercise arm 40a in a first rotational direction "A", above the vehicle floor 15 and toward a front edge 24a of the seat bottom 24 when the exercise arm 40a is operatively connected to the resistance mechanism 30. The resistance mechanism 30 may also be structured to resist rotation of the exercise arm 40a in a second rotational direction "B" opposite the first rotational direction "A" when the exercise arm 40a is operatively connected to the resistance mechanism 30.

Referring to FIGS. 1-3, in one or more arrangements, the resistance mechanism 30 includes a resistance mechanism housing and an exercise arm coupling mechanism connected to the resistance mechanism housing 30a so as to be rotatable with respect to the resistance mechanism housing. In the embodiment shown in FIGS. 1-3, the resistance mechanism housing is formed by the seat base 26.

In one or more arrangements, and as shown in FIGS. 1-3, the exercise arm coupling mechanism includes a shaft 30b connected to the seat base/resistance mechanism housing so as to be rotatable with respect to the resistance mechanism housing. In one or more examples, the shaft 30b may be rotatably supported near its ends by bearings 30c, 30d mounted in opposed side walls 26b, 26c of the seat base 26.

The exercise arm coupling mechanism is also structured to be connected to the attachment portions or one or more exercise arms so as to rotate in angular correspondence with the one or more exercise arms when the arm(s) are operatively connected to the resistance mechanism by the exercise arm coupling mechanism. As used herein, the term "angular correspondence" refers to rotation of two or more connected elements through the same arc length or by the same angular amount. Thus, for example, in the embodiment shown in FIGS. 1-3, when exercise arm 40a is rotated through an angle of 20° by a user, the portion of the exercise arm coupling mechanism (shaft 30b in FIGS. 1-3) connected to the exercise arm attachment portion 40a-1 will also rotate 20°, in angular correspondence with the exercise arm attachment portion 40a-1 attached thereto. The exercise arm attachment portion 40a-1 may be connected to the shaft 30b using splines, keys, or any other mechanism designed to ensure that the exercise arm attachment portion 40a-1 and the shaft 30b (or another embodiment of the exercise arm coupling mechanism) will rotate in angular correspondence.

The resistance mechanism 30 may also include at least one spring member 44 operatively connected to the exercise arm coupling mechanism shaft 30b so as to provide a biasing force urging rotation of the exercise arm coupling mechanism shaft 30b in the first rotational direction "A" when the exercise 40a arm is connected to the resistance mechanism 30 by the exercise arm coupling mechanism shaft 30b. The spring member 44 may also provide a resistance force acting against rotation of the exercise arm coupling mechanism shaft 30b in the second rotational direction "B" when the exercise arm 40a is operatively connected to the resistance mechanism 30 by the exercise arm coupling mechanism shaft 30b.

For example, in the embodiment shown in FIGS. 1-3, a spring member 44 in the form of a torsion spring member is provided. The torsion spring member 44 may have a first spring member portion 44a attached to the shaft 30b so as to rotate in angular correspondence with the shaft 30b. The torsion spring member 44 may also have a second spring member portion 44b connected to the resistance mechanism housing (in FIGS. 1-3, seat base 26) or to another relatively static feature, so as to be fixed with respect to the resistance mechanism housing 26. In this arrangement, the torsion spring member 44 is structured and attached to the shaft 30b and to the resistance mechanism housing 26 so as to bias the exercise arm 40a coupled connected to the shaft 30b in rotational direction "A".

In one or more arrangements, the spring member 44 may bias the exercise arm 40a connected to the exercise arm coupling mechanism shaft 30b so as to rotate the exercise arm occupant manipulation portion 40a-1 in a direction "A" toward a stowed condition in contact with a floor 15 of the vehicle when the exercise arm 40a is connected to the resistance mechanism 30 by the exercise arm coupling mechanism shaft 30b and the vehicle seat assembly 16 is mounted to the floor 15 of the vehicle. The stowed condition may be a condition in which the exercise arm 40a is positioned when the arm 40a is not being used by a seat occupant, so that the exercise arm does not interfere with the occupant's interaction with the vehicle or other occupant activities.

Also, in the arrangement shown in FIGS. 1-3, rotation of exercise arm 40a in direction "B" will correspondingly rotate the shaft 30b, causing the first spring member portion 44a to angularly displace with respect to second spring member portion 44b, thereby producing a resilient torsional deflection of the spring member 44 resulting in a reaction force resisting the rotation of the exercise arm 40a in direction "B". This arrangement provides a progressive resistance force to a seat occupant rotating the exercise arm 40a in, for example, an arm curling motion or a rowing motion. Other spring types and connection arrangements directed to achieving the same effect are also possible. Although FIG. 1 shows a single spring member 44 incorporated into the resistance mechanism 30, embodiments including more than one spring member are also contemplated.

The resistance mechanism 30 may also include a locking mechanism (generally designated 30m) operatively connected to the exercise arm coupling mechanism and structured to releasably lock the exercise arm coupling mechanism in a user-selected configuration, so as to prevent rotation of the exercise arm coupling mechanism. The locking mechanism 30m may be disengaged to enable a user to rotate the exercise arm 40a to a desired angular orientation for exercising, and then engaged to lock the arm 40a in the desired orientation. For example, arms 40a and 40b may be rotated to the orientation shown by the phantom line in FIG. 2 to enable the seat occupant to grasp and hold the occupant manipulation portion(s) of the exercise arms during performance of a cycling-type exercise using an embodiment of the pedal mechanism 38 previously described.

Referring to FIG. 5, for performance of a rowing exercise, a user may use an embodiment of the vehicle seat assembly as shown in FIGS. 1-3. The seat back 22 may be locked in a fully reclined orientation as shown. The pedals 38b and 38c of the pedal mechanism 38 may be rotationally locked as previously described, thereby enabling a user to brace his feet against the pedals during rowing. This may enable a seated occupant to engage in a rowing motion as shown by rotating the arms 40a and 40b backward as shown in FIG. 5. After reclining in the seat, the user may use his feet secured in the pedal foot straps to pull himself up and forward, allowing the exercise arms to move forward under the biasing form of the exercise arm spring member(s). The user may then pull the exercise arms backwards and push against the pedals to repeat the rowing motion.

In one or more arrangements, the locking mechanism 30m may include a first locking gear 31a connected to the exercise arm coupling mechanism so as to rotate in angular correspondence with the exercise arm coupling mechanism. In addition, the locking mechanism 30m may include a locking pawl 31b engageable by a user with the first locking gear 31a to lock the first locking gear in a user-selected configuration so as to prevent rotation of the exercise arm coupling mechanism.

For example, in the arrangement shown in FIG. 1-3, first locking gear 31a may be fixed to the exercise arm coupling mechanism (in this case, shaft 30b) proximate an end of the exercise arm coupling mechanism using a key or other method so that the gear and the coupling mechanism rotate in angular correspondence. The locking pawl 31b may be rotatably attached to the seat base 26. The first locking gear 31a and locking pawl 31b may be positioned along the exterior of the seat base and along a side of the seat base (for example, along the left side of the seat base as shown in FIGS. 1-3) so as to be easily accessible to a user from a position alongside the seat or sitting in the seat. When the exercise arm 40a is rotated to a desired orientation, locking pawl 31b may be moved by a user to engage first locking gear 31a, thereby preventing rotation of the first locking gear 31a and exercise arm coupling mechanism shaft 30b and locking the exercise arm 40a in the desired orientation.

In one or more arrangements, another locking gear (not shown in the drawings) may also be connected to the exercise arm coupling mechanism shaft 30b so as to rotate in angular correspondence with the exercise arm coupling mechanism shaft. In addition, a second pawl may be engageable by a user with the second locking gear to lock the second locking gear in a user-selected configuration so as to prevent rotation of the exercise arm coupling mechanism shaft 30b. For example, in the arrangement shown in FIGS. 1-3, the second locking gear may be fixed to the shaft 30b proximate an end of the shaft opposite the end at which the first locking gear 31a is secured, using a key or other method so that the gear and the shaft rotate in angular correspondence. The second pawl may be rotatably attached to the seat base 26. The second locking gear and second pawl may be positioned (for example, exterior of the seat base) along the right side of the seat base 26 so as to be easily accessible to a user from a position alongside the vehicle seat assembly 16 or sitting in the vehicle seat assembly 16. The exercise arms 40a, 40b may be rotated to a desired orientation, then the second pawl engaged with the second locking gear along the right side of the exercise seat to aid in securing the exercise arms 40a, 40b in the desired orientations. Alternatively, any of a variety of other mechanisms may be used to secure the exercise arm(s) in a desired angular configuration for a given exercise.

Referring to FIG. 4, in one or more alternative arrangements, a resistance mechanism 130 may include a shaft such as shaft 30b and a locking mechanism 130m including a first locking gear such as gear 31a connected to the shaft 30b so as to rotate in angular correspondence with the shaft as previously described. A locking pawl 31b may be incorporated to lock the first locking gear 31a as previously described. First locking gear 31a and locking pawl 31b may be mounted along an exterior of the resistance mechanism housing (in this case, seat base 26) so as to be engageable by a user after positioning the exercise arms in a desired angular orientation.

In addition, the resistance mechanism 130 may incorporate a first spring gear 50a rotatably connected to the resistance mechanism housing so as to be rotatable with respect to the resistance mechanism housing. The first spring gear 50a may be rotatably connected to the resistance mechanism housing on an inside of the resistance mechanism housing. The spring member 51 may be connected to the resistance mechanism housing and to the first spring gear 50a in the manner previously described so that rotation of the first spring gear 50a tensions the spring member 51.

The resistance mechanism 130 may also include another locking gear 139a similar to gear 31a and connected to the shaft 30b so as to rotate in angular correspondence with the shaft. The other locking gear 139a may be positioned inside the resistance mechanism housing. The other locking gear 139a may be positioned on shaft 30b so as to mesh with or engage the first spring gear 50a so as to rotate the first spring gear 50a in direction "B" when the first locking gear 31a is rotated in direction "A". In this arrangement, as exercise arms 40a, 40b are rotated, shaft 30b rotates in angular correspondence with the exercise arms. Rotation of the shaft 30b also rotates the interior locking gear 139a and the exteriorly-mounted first locking gear 31a. The engagement between interior locking gear 139a and first spring gear 50a causes the first spring gear 50a to rotate, producing a resilient torsional deflection of the spring member 51 resulting in a reaction force resisting the rotation of the exercise arms 40a, 40b in direction "B". When the arms 40a, 40b have been rotated to the desired angular orientation, the arms may be locked in this orientation by engaging locking pawl 31b with first locking gear 31a, thereby preventing further rotation of the shaft 30b as previously described.

Figure 6:
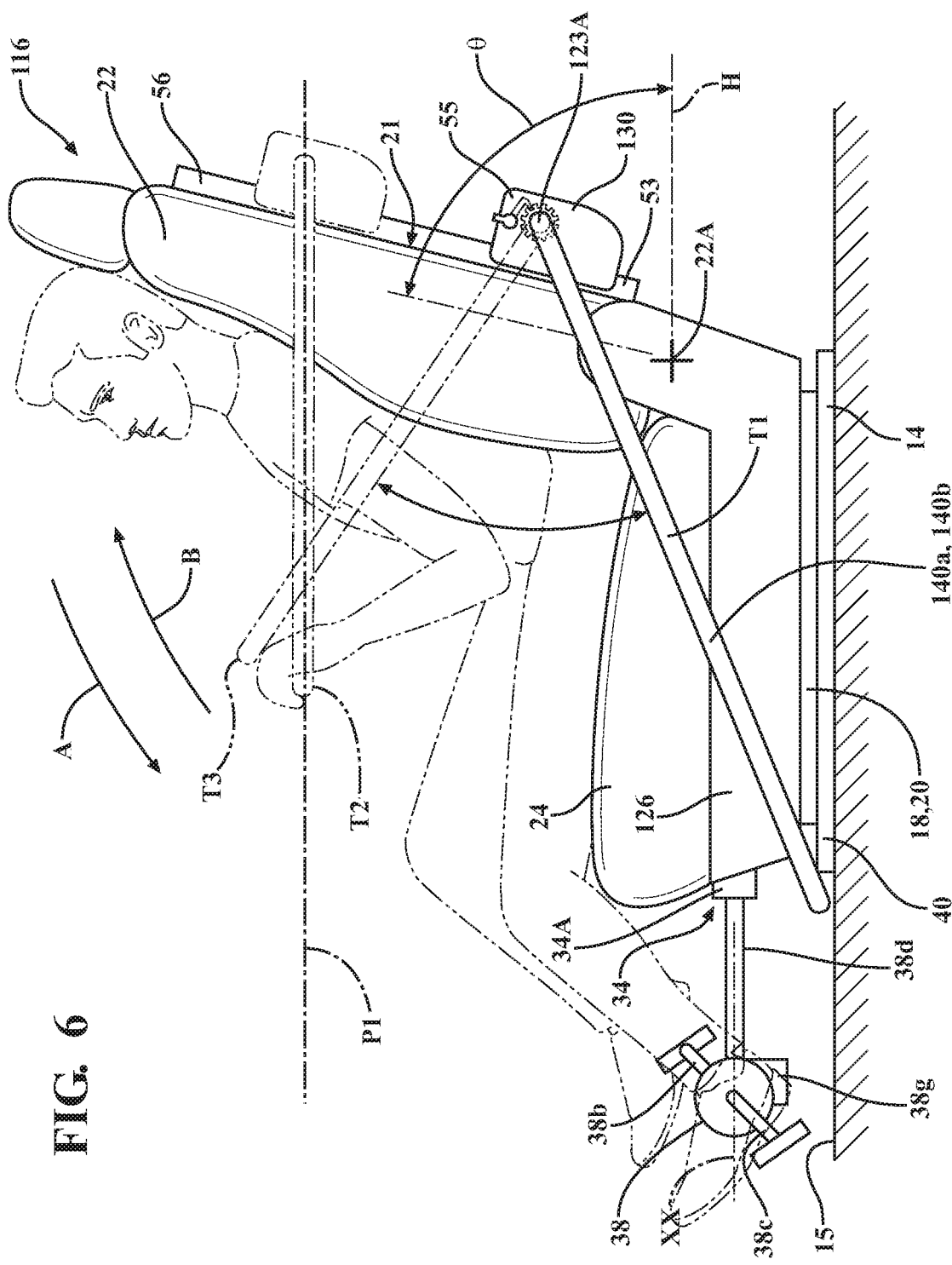
FIG. 6 is a schematic side view of a vehicle seat assembly in accordance with another embodiment described herein, incorporating one or more exercise arms and a pedal mechanism.

Referring now to FIG. 6, in one or more arrangements, another embodiment 116 of the vehicle seat assembly may include a seat base 126, a seat back 22 rotatably connected to the seat base 26, a seat bottom 24 mounted on the seat base 26, and at least one of a resistance mechanism, a bicycle seat receptacle, and a docking mechanism mounted to one of the seat base 26, seat back 22, and seat bottom 24. The bicycle seat receptacle (not shown) and the docking mechanism 34 may be structured as previously described with respect to vehicle seat assembly 16.

Referring to FIG. 6, the resistance mechanism may be structured as previously described to exert a biasing force on one or more exercise arms (such as exercise arms 140a and 140b, for example) operatively connected to the resistance mechanism. For example, the resistance mechanism may be structured in the manner of either mechanism 30 or mechanism 130 as previously described, or the resistance mechanism may have any other suitable configuration. In the embodiment shown in FIG. 6, a resistance mechanism 130 as previously described may be incorporated into the resistance mechanism housing 55. Although FIG. 6 shows arms 140a, 140b having the spring-loaded structure shown in FIG. 9 (described below), or the exercise arms may have any other suitable structure.

In the embodiment shown in FIG. 6, the seat back 22 may have a mounting bracket or rail 56 attached thereto. In addition, a resistance mechanism housing 55 may be movably mountable to the mounting rail 56 so as to enable a distance between the resistance mechanism housing and the floor 15 of the vehicle to be varied when the resistance mechanism housing 55 is movably mounted to the mounting rail 56 and the vehicle seat assembly 116 is mounted to the floor 15 of the vehicle. The movable housing 55 may have mounted thereon any of the resistance mechanism element embodiments previously described (for example, an exercise arm coupling mechanism, one or more spring members, a locking mechanism, etc.) The mounting bracket 56 and movable housing 55 are structured to enable the housing 55 to be easily moved along the length of the bracket, and to enable the housing to be easily and quickly mounted on and removed from the bracket.

The exercise arm coupling mechanism may be in the form of a shaft (not shown) similar to shaft 30b previously described. The shaft may extend between opposed walls of the movable housing 55 and may be rotatably mounted to the movable housing 55 using bearings, for example. Also, a first locking gear 31a and locking pawl 131b similar to the first locking gear 31a and locking pawl 31b previously described may be rotatably connected to the movable housing so as to be accessible to a user or seat occupant.

In addition, a movable housing locking mechanism 53 may be structured to be engageable to secure the movable resistance mechanism housing 55 at a desired location along the mounting rail to prevent movement of the resistance mechanism housing along the mounting rail. The housing locking mechanism may have any form suitable for locking the movable housing at a location along the mounting rail. For example, a conventional spring-mounted locking pin may mounted in the movable housing 55, and may be structured for insertion into any hole in a line of collinear engagement holes provided in the mounting bracket 56. In another example, a set screw (not shown) may be mounted in the movable housing 55. The set screw may be actuated by a manually turnable knob and may be structured in a known manner for contacting a portion of the mounting rail 56 when the screw is tightened, thereby pressing against the mounting rail 56 at a desired location along the rail to retain the housing 55 in a desired location along the rail.

Movable housing 55 may be movable along mounting bracket 56 to enable a user to control the position of the arm rotational axis 123A with respect to the seat occupant. This enables the arm rotational axis position to be varied for occupant comfort prior to performance of various exercises. The movable housing 55 may then be secured at a desired location along mounting rail 56 using the movable housing locking mechanism for performance of a desired exercise.

For example, referring to FIG. 6, for performance of a "bench press"-type exercise, a user may adjust the height of the arm rotational axis 123A above the vehicle floor 15 so that the arm rotational axis 123A lies along a horizontal plane P1 extending through the seat occupant's shoulders. The user may then rotate the exercise arm(s) 140a, 140b to an orientation T2 extending along the plane P1 and lock the arms in this orientation using an embodiment of the resistance mechanism locking mechanism, as previously described. The effective lengths of the arms may also be increased or decreased as needed, as described herein. In another example, to perform a rowing exercise in an vehicle seat assembly embodiment including a movable housing as shown in FIG. 6, the movable housing 55 may be moved to a location along the mounting rail 56 at or about where the arm rotational axis 123A resides along a horizontal plane passing through the hip joints of a seated occupant, and the exercise arm may be rotated to and locked in an orientation T1, for example. The movable housing 55 may then be locked in position. The effective lengths of the arms may also be increased or decreased as needed, and as described herein. In addition, the seat back 22 may be locked in a fully reclined orientation as shown in FIG. 5. This may enable a seated occupant to engage in the rowing motion described above.

In an embodiment such as shown in FIG. 6, the exercise arms 140a, 140b may be stowed by moving the resistance mechanism housing 55 to a lowest point on the rail 56, and locking the housing 55 in this position. The exercise arms may then be rotated into stowed orientations. In cases where the effective lengths of the exercise arms must be adjusted to enable the arms to be stowed along the sides of the seat 21 with occupant manipulation portions residing in front of the seat base 126, the arm lengths may be adjusted as described herein and locked in configurations providing arms of sufficient lengths to be rotatable past the front of seat bottom 24.

Incorporation of the exercise arm coupling mechanism into a resistance mechanism housing which may be easily mounted on (and removed from) the mounting bracket 56 also enables the housing 55 to be easily changed over from a housing including exercise arm spring member(s) providing a first resistance to exercise arm motion, to a housing including exercise arm spring member(s) providing a second resistance to exercise arm motion, which may be either greater than or less than the first resistance. This enables a user to easily adjust the exercise arm resistance as desired.

Embodiments of the exercise arm described herein may be structured such that all portions of the exercise arm rotate in angular correspondence with each other when the exercise arm is coupled connected to a resistance mechanism as described herein. Thus, the exercise arm may be essentially rigid with regard to rotation of the exercise arm about an arm rotational axis 123A extending through the exercise arm coupling mechanism.

Referring to FIGS. 7-10, in one or more arrangements, exercise arm occupant manipulation portion 40a-2 and exercise arm attachment portion 40a-1 (FIG. 7) may be formed from separate pieces. In addition, one of the attachment portion 40a-1 and the occupant manipulation portion 40a-2 may have an end structured to be slidably received in a cavity formed in the other one of the attachment portion 40a-1 and the occupant manipulation portion 40a-2, so as to enable a distance between the occupant manipulation portion 40a-2 and the arm rotational axis 123A to be varied when the exercise arm 40a is operatively connected to a resistance mechanism. For example, in the embodiment shown in FIG. 7, an end 61 of exercise arm attachment portion 40a-1 is structured to slidably receive an end 63 of the occupant manipulation portion 40a-2 therein. In particular embodiments, this arrangement enables the effective length L1 of the exercise arm to be varied according to the preferences of a seat occupant (for example, to enable the exercise arm length to be adjusted according to the length of an occupant's arms). The effective length of an exercise arm may be a length extending from a rotational axis of the exercise arm to an end of the exercise arm, in a direction in which the occupant manipulation portion moves with respect to the exercise arm attachment portion. For example, in the embodiment shown in FIG. 7, the effective length L1 may be a length extending from a rotational axis 123A of the exercise arm to an end of the exercise arm, in a direction P1 in which the occupant manipulation portion 40a-2 may move with respect to the exercise arm attachment portion 40a-1.

A securement mechanism may also be provided for releasably securing the occupant manipulation portion 40a-2 with respect to the attachment portion 40a-1, to prevent movement of the occupant manipulation portion 40a-2 with respect to the attachment portion 40a-1. In one example, a series of coaxial, spaced-apart holes 61a may be formed along the attachment portion 40a-1 for receiving a spring-actuated push pin 65 therein. Push-pin 65 may be mounted along an exterior of the occupant manipulation portion 40a-2 and aligned with holes 61a such that movement of the occupant manipulation portion 40a-2 along the interior of attachment portion end 61 will enable the push-pin to enter and engage any of the holes 61a as desired by a user. The user may disengage the push-pin 65 from attachment portion 40a-1 by pressing the pin toward the interior of the attachment portion end 61, thereby forcing the push-pin 65 out of one of attachment portion holes 61a and permitting the occupant manipulation portion 40a-2 to slide with respect to the attachment portion 40a-1. Alternatively, a pin or other securement mechanism (not shown) may be applied to extend through a desired one of attachment portion holes 61a and a hole (not shown) formed in occupant manipulation portion 40a-2 when the hole formed in the occupant manipulation portion 40a-2 is brought into alignment with a desired one of holes 61a formed in the attachment portion 40a-1. In the manner described above, the length L1 of the exercise arm may be adjusted in accordance with user preferences.

Figure 9:
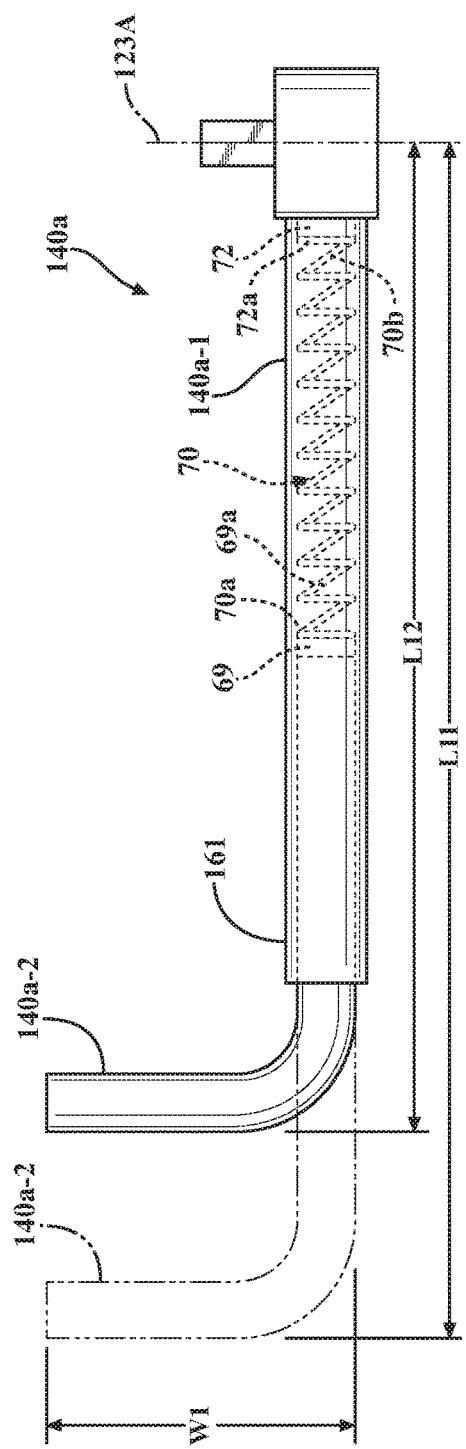
FIG. 9 is a schematic plan view of an exercise arm in accordance with yet another embodiment described herein.

In particular embodiments of the exercise arm, an arm spring member may connect the attachment portion to the occupant manipulation portion such that the arm spring member resiliently deflects responsive to movement of the occupant manipulation portion with respect to the attachment portion in a direction away from the arm rotational axis when the exercise arm is coupled connected to the resistance mechanism. This provides a force resisting the movement of the occupant manipulation portion with respect to the attachment portion. Referring to FIG. 9, in one embodiment 140a of an arm incorporating an arm spring member, arm spring member 70 may have a first end 70a attached to an interior end of the occupant manipulation portion 140a-2 (using a hook 69a attached to a suitable first end cap 69, for example). A second end 70b of the arm spring member 70 may be attached to an interior end of the attachment portion (using a hook 72a attached to a suitable second end cap 72, for example). Arm spring member 70 may be in the form of a coil spring, or the spring member 70 may have any suitable configuration. Then movement by a user of the occupant manipulation portion 140a-2 in the direction P1 will produce a resilient deflection of the arm spring member 70, thereby providing a progressive resistance force during exercise of the seat occupant as the length L1 of the exercise arm increases.

In one or more arrangements, a locking pin or other mechanism may be provided for securing a position of the occupant manipulation portion with respect to the attachment portion, in an exercise arm embodiment where the occupant manipulation portion is attached to the attachment portion using an arm spring member. This enables the spring-mounted occupant manipulation portions of the arms to be extended and secured so as to allow the ends of the arms to extend past the front edge 24a of seat bottom 24 when the arms are rotated toward vehicle floor 15.

Figure 10:
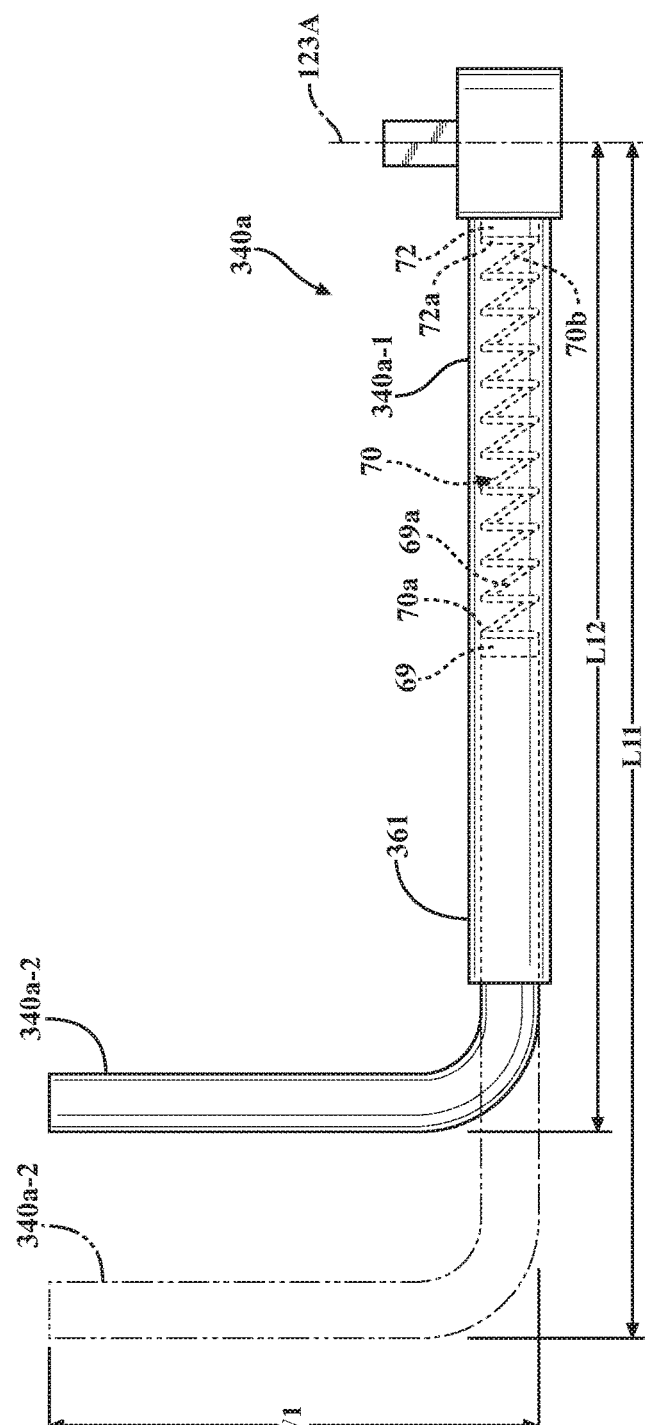
FIG. 10 is a schematic plan view of an exercise arm in accordance with yet another embodiment described herein.
Figure 11:
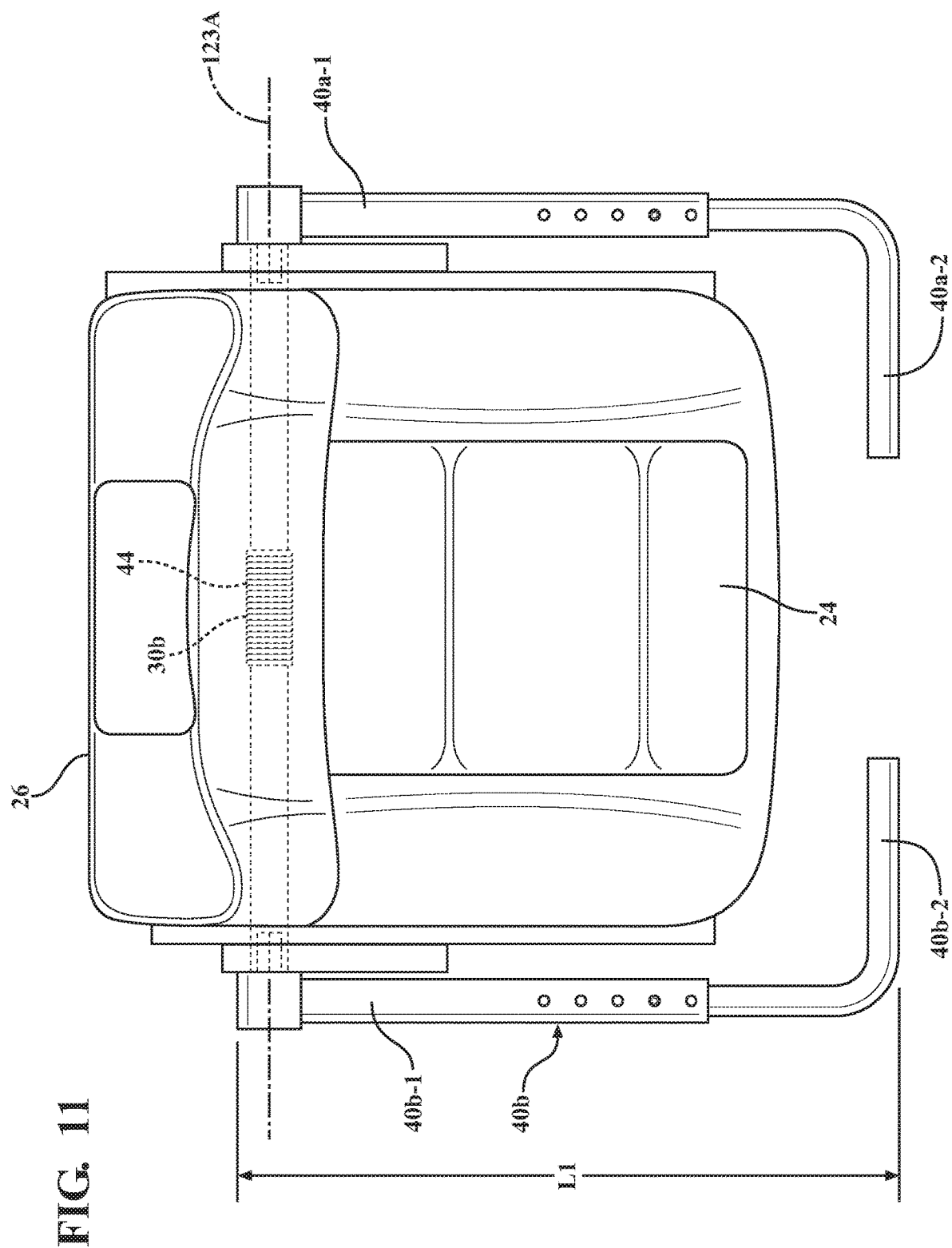
FIG. 11 is a schematic plan view of a vehicle seat assembly incorporating a pair of adjustable exercise arms as shown in FIG. 7.

Referring to FIGS. 8 and 10, and in particular to FIG. 10, in other embodiments of the exercise arm, exercise arm occupant manipulation portion 340a-2 and exercise arm attachment portion 340a-1 of exercise arm 340a may be formed from separate pieces as shown in FIG. 7. In addition, one of the attachment portion 340a-1 and the occupant manipulation portion 340a-2 may have an end structured to be slidably received in a cavity formed in the other one of the attachment portion 340a-1 and the occupant manipulation portion 340a-2, so as to enable a distance between the occupant manipulation portion 340a-2 and the arm rotational axis 123A to be varied as previously described. In the embodiment sown in FIG. 10, the occupant manipulation portion 340a-2 may be slidably received in an end 361 of attachment portion 340a-1. Also, the width W1 of the occupant manipulation portion 340a-2 of the exercise arm may be dimensioned to extend across an entire width (or substantially the entire width) of the seat bottom 24. This enables a single exercise arm to be operatively connected to the resistance mechanism along a single side of the vehicle seat assembly, for example in applications where space may be limited along one side of the seat assembly. This extended occupant manipulation portion also enables a seat occupant to grip the manipulation portion with both hands if desired, even if only one exercise arm is connected to (and extends from) a single side of the exercise seat. FIG. 8 shows an embodiment 240a of an exercise arm structured for adjustable length L1 as shown in the embodiment of FIG. 7, and including an extended-width occupant manipulation portion. FIG. 10 shows an embodiment of an exercise arm incorporating an internal spring member 70 similar to the embodiment shown in FIG. 9, and including an extended-width occupant manipulation portion.

The interface structures (such as splines) for coupling the exercise arm to the resistance mechanism may be standardized so that one type of exercise arm (for example, an arm as shown in FIG. 7) may be easily removed and replaced in the same resistance mechanism by any other type of exercise arm (for example, an arm as shown in any of FIG. 8, 9, or 10). In addition, for an exercise arm (such as arm 140a) incorporating an internal spring member, an arm having a relatively stiffer spring for relatively greater resistance may be connected in place of an arm having a relatively "softer" spring with relatively less resistance to movement of the occupant manipulation portion.

Figure 14:
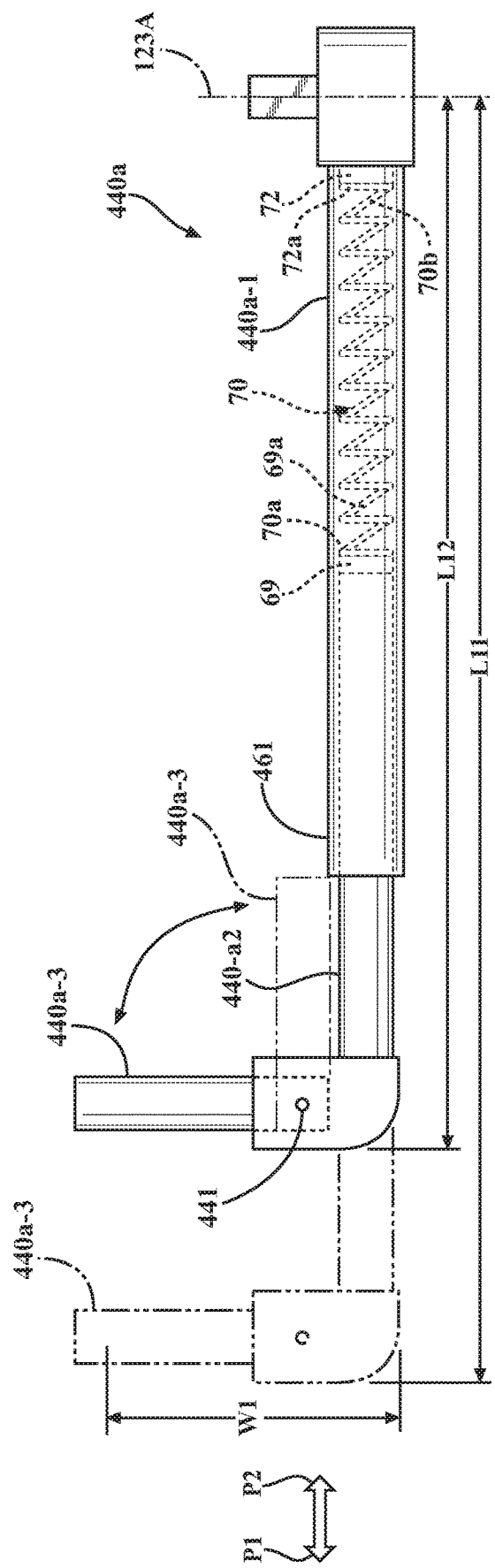
FIG. 14 is a schematic plan view of a foldable exercise arm occupant manipulation portion, in accordance with an embodiment described herein.

Referring to FIG. 14, in one or more arrangements 440a of the exercise arm, the occupant manipulation portion of an exercise arm may include a first portion 440a-2 extendibly connected to the attachment portion 440a-1 as previously described, and a second portion 440a-3 rotatably connected to the first portion 440a-2 (using a hinge mechanism 441, for example). This enables the second portion 440a-3 of the occupant manipulation portion to be folded back along the first portion 440a-2 of the occupant manipulation portion, so as to extend parallel with the first portion 440a-2 of the occupant manipulation portion and also parallel with the end 461 of the attachment portion 440a-1 receiving the occupant manipulation portion. This may enable more compact stowage of the ends of the exercise arms in certain configurations.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

In the preceding detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein. Accordingly, reference should be made to the following claims, rather than to the foregoing specification, as indicating the scope of the invention.

What is claimed is:

1. A vehicle seat assembly comprising:
   a seat base;
   a seat back rotatably connected to the seat base;
   a seat bottom mounted on the seat base; and
   at least one of:
   a resistance mechanism coupled to one of the seat base and the seat back, the resistance mechanism being structured to exert a biasing force on at least one exercise arm operatively connected to the resistance mechanism;
   a bicycle seat receptacle coupled to the seat base and structured for detachably mounting a bicycle seat to the seat base; and
   a docking mechanism coupled to the seat base and structured for detachably mounting a pedal mechanism to the seat base.

2. The vehicle seat assembly of claim 1 wherein the vehicle seat assembly includes the resistance mechanism, wherein the resistance mechanism is structured such that the biasing force urges rotation of the at least one exercise arm in a first rotational direction, above a floor of a vehicle in which the vehicle seat assembly is mounted and toward a front edge of the seat bottom when the one exercise arm is operatively connected to the resistance mechanism, and wherein the resistance mechanism is structured to resist rotation of the at least one exercise arm in a second rotational direction opposite the first rotational direction when the at least one exercise arm is operatively connected to the resistance mechanism.

3. The vehicle seat assembly of claim 2 further comprising the at least one exercise arm operatively connected to the resistance mechanism, the at least one exercise arm including an attachment portion structured to be operatively connected to the resistance mechanism, and an occupant manipulation portion connected to the attachment portion and structured to be grasped by a user.

4. The vehicle seat assembly of claim 3 wherein the resistance mechanism comprises:
   a resistance mechanism housing and an exercise arm coupling mechanism connected to the resistance mechanism housing so as to be rotatable with respect to the resistance mechanism housing, the exercise arm coupling mechanism being structured to be connected to the at least one exercise arm attachment portion so as to rotate in angular correspondence with the at least one exercise arm when the at least one exercise arm is operatively connected to the resistance mechanism by the exercise arm coupling mechanism;
   at least one spring member operatively connected to the exercise arm coupling mechanism so as to provide a biasing force urging rotation of the exercise arm coupling mechanism in the first rotational direction when the at least one exercise arm is operatively connected to the resistance mechanism by the exercise arm coupling mechanism, and so as to provide a resistance force acting against rotation of the exercise arm coupling mechanism in the second rotational direction when the at least one exercise arm is operatively connected to the resistance mechanism by the exercise arm coupling mechanism; and
   a locking mechanism operatively connected to the exercise arm coupling mechanism and structured to releasably lock the exercise arm coupling mechanism in a user-selected configuration so as to prevent rotation of the exercise arm coupling mechanism.

5. The vehicle seat assembly of claim 4 wherein the exercise arm coupling mechanism comprises a shaft connected to the resistance mechanism housing so as to be rotatable with respect to the resistance mechanism housing, and structured to be connectible to the at least one exercise arm attachment portion so as to rotate in angular correspondence with the at least one exercise arm.

6. The vehicle seat assembly of claim 5 wherein the at least one spring member comprises a torsion spring having a first spring member portion attached to the shaft so as to rotate in angular correspondence with the shaft, and a second spring member portion connected to the resistance mechanism housing so as to be fixed with respect to the resistance mechanism housing.

7. The vehicle seat assembly of claim 4 further comprising a first locking gear connected to the exercise arm coupling mechanism so as to rotate in angular correspondence with the exercise arm coupling mechanism, and wherein the locking mechanism comprises a pawl engageable by the user with the first locking gear to lock the first locking gear in a user-selected configuration so as to prevent rotation of the exercise arm coupling mechanism.

8. The vehicle seat assembly of claim 7 further comprising a first spring gear connected to the resistance mechanism housing so as to be rotatable with respect to the resistance mechanism housing and structured to mesh with the first locking gear so as to rotate in the second rotational direction responsive to rotation of the first locking gear in the first rotational direction, and wherein the at least one spring member comprises a torsion spring having a first spring member portion connected to the first spring gear so as to rotate in angular correspondence with the first spring gear, and a second spring member portion connected to the resistance mechanism housing so as to be fixed with respect to the resistance mechanism housing.

9. The vehicle seat assembly of claim 3 wherein one of the attachment portion and the occupant manipulation portion has an end structured to be slidably received in a cavity formed in the other one of the attachment portion and the occupant manipulation portion, so as to enable a distance between the occupant manipulation portion and a rotational axis of the at least one exercise arm to be varied when the at least one exercise arm is operatively connected to the resistance mechanism.

10. The vehicle seat assembly of claim 9 further comprising a securement mechanism structured for releasably securing the occupant manipulation portion with respect to the attachment portion, to prevent movement of the occupant manipulation portion with respect to the attachment portion.

11. The vehicle seat assembly of claim 9 wherein the at least one exercise arm further comprises an arm spring member connecting the attachment portion to the occupant manipulation portion such that the arm spring member resiliently deflects responsive to a movement of the occupant manipulation portion with respect to the attachment portion in a direction away from the rotational axis of the at least one exercise arm when the at least one exercise arm is operatively connected to the resistance mechanism, so as to provide a force resisting the movement of the occupant manipulation portion with respect to the attachment portion.

12. The vehicle seat assembly of claim 3 wherein the at least one exercise arm comprises an exercise arm and another exercise arm, each of the exercise arms including an associated attachment portion structured to be operatively connected to the resistance mechanism, each of the exercise arms also including an occupant manipulation portion connected to the associated attachment portion and structured to be grasped by the user, wherein the resistance mechanism is structured such that the biasing force urges rotation of the occupant manipulation portion of the exercise arm and rotation of the occupant manipulation portion of the other exercise arm in the first rotational direction, above the floor of the vehicle and toward a front edge of the seat bottom when the exercise arm and the other exercise arm are operatively connected to the resistance mechanism, and wherein the resistance mechanism is structured to resist rotation of the exercise arm and the other exercise arm in the second rotational direction when the exercise arm and the other exercise arm are operatively connected to the resistance mechanism.

13. The vehicle seat assembly of claim 3 wherein the resistance mechanism is structured such that the biasing force urges rotation of the at least one exercise arm occupant manipulation portion in a direction toward a stowed condition in contact with a floor of the vehicle when the at least one exercise arm is operatively connected to the resistance mechanism by the exercise arm coupling mechanism and the vehicle seat assembly is mounted to the floor of a vehicle.

14. The vehicle seat assembly of claim 1 wherein the vehicle seat assembly includes the docking mechanism coupled to the seat base, and wherein the docking mechanism includes a docking receptacle and a charging interface.

15. The vehicle seat assembly of claim 14 further comprising a pedal mechanism structured for docking with the docking mechanism, the pedal mechanism including a generator, a power connection interface electrically connected to the generator and structured to be electrically connected with the charging interface, and at least one foot pedal structured to be movable by a user to operate the generator so as to generate an electrical current to the power connection interface.

16. The vehicle seat assembly of claim 15 wherein the pedal mechanism further comprises a pedal locking mechanism structured to prevent movement of the at least one foot pedal.

17. The vehicle seat assembly of claim 1 wherein the vehicle seat assembly includes the bicycle seat receptacle, and wherein the bicycle seat receptacle is also structured for detachably mounting the seat bottom to the seat base.

18. The vehicle seat assembly of claim 1 wherein the seat back has a mounting rail attached thereto, wherein the resistance mechanism includes a resistance mechanism housing structured to be movably mountable to the mounting rail so as to enable a distance between the resistance mechanism housing and a floor of a vehicle to be varied when the resistance mechanism housing is movably mounted to the mounting rail and the vehicle seat assembly is mounted to the floor of the vehicle, and wherein the vehicle seat assembly further comprises a housing locking mechanism structured to be engageable to secure the resistance mechanism housing at a location along the mounting rail to prevent movement of the resistance mechanism housing along the mounting rail.

* * * * *